(12) United States Patent
Shige

(10) Patent No.: US 12,437,874 B2
(45) Date of Patent: Oct. 7, 2025

(54) MEDICAL INFORMATION PROCESSING APPARATUS, MEDICAL INFORMATION PROCESSING SYSTEM, AND MEDICAL INFORMATION PROCESSING METHOD

(71) Applicant: CANON MEDICAL SYSTEMS CORPORATION, Tochigi (JP)

(72) Inventor: Fumimasa Shige, Otawara (JP)

(73) Assignee: CANON MEDICAL SYSTEMS CORPORATION, Tochigi (JP)

( * ) Notice: Subject to any disclaimer, the term of this patent is extended or adjusted under 35 U.S.C. 154(b) by 861 days.

(21) Appl. No.: 17/454,085

(22) Filed: Nov. 9, 2021

(65) Prior Publication Data

US 2022/0148735 A1 May 12, 2022

(30) Foreign Application Priority Data

Nov. 9, 2020 (JP) .................................. 2020-186647

(51) Int. Cl.
*G16H 50/30* (2018.01)
(52) U.S. Cl.
CPC .................................. *G16H 50/30* (2018.01)
(58) Field of Classification Search
CPC ..................................................... G16H 50/30
USPC ....................................................... 705/2–3
See application file for complete search history.

(56) References Cited

U.S. PATENT DOCUMENTS

| | | | |
|---|---|---|---|
| 6,654,628 B1 | 11/2003 | Silber et al. | |
| 9,928,593 B2 * | 3/2018 | Ooga | G06T 7/0012 |
| 10,658,085 B2 | 5/2020 | Shim | |
| 2015/0245776 A1 * | 9/2015 | Hirohata | A61B 6/5217 600/504 |
| 2017/0095221 A1 * | 4/2017 | Kato | G16H 30/40 |
| 2018/0092616 A1 * | 4/2018 | Sakaguchi | G16H 30/40 |
| 2018/0144475 A1 * | 5/2018 | Hoi | A61B 6/504 |
| 2019/0082970 A1 | 3/2019 | Lamata De La Orden et al. | |
| 2019/0130074 A1 | 5/2019 | Itu et al. | |

FOREIGN PATENT DOCUMENTS

JP 2018-083056 A 5/2018

OTHER PUBLICATIONS

Samady et al., "Coronary Artery Wall Shear Stress Is Associated With Progression And Transformation of Atherosclerotic Plaque And Arterial Remodeling In Patients With Coronary Artery Disease", Circulation 124.7, 2011, pp. 779-788 (Year: 2011).*
Samady et al., "Coronary Artery Wall Shear Stress Is Associated With Progression and Transformation of Atherosclerotic Plaque And Arterial Remodeling in Patients With Coronary Artery Disease", Circulation 124.7, 2011, pp. 779-788.
Office Action issued Jul. 23, 2025, in corresponding Japanese Patent Application No. 2021-182330, 3 pages.

* cited by examiner

*Primary Examiner* — Joy Chng
(74) *Attorney, Agent, or Firm* — Oblon, McClelland, Maier & Neustadt, L.L.P.

(57) ABSTRACT

A medical information processing apparatus according to an embodiment includes: a memory configured to store therein a plurality of settings about at least one of a calculation condition, a shape, a characteristic, and a fluid; and a processing circuitry configured to select at least one of the plurality of settings, to determine the selected setting as an analysis condition, and to calculate a reliability with respect to an index value that is related to a blood flow and is calculated under the analysis condition.

19 Claims, 19 Drawing Sheets

FIG.2

```
START
  ↓                                    S101
OBTAIN VARIOUS TYPES OF DATA
   TO BE USED IN ANALYSIS
  ↓                                    S102
SET ANALYSIS CONDITION
  ↓                                    S103
CALCULATE WSS AND RELIABILITY
  ↓                                    S104
DISPLAY WSS AND RELIABILITY
  ↓
END
```

FIG.3A

|  | MESH SIZE | MESH SHAPE | MESH QUALITY | TEMPORAL RESOLUTION | CALCULATION MODEL |
|---|---|---|---|---|---|
| RELIABILITIES OF CALCULATION CONDITION | A1 | A2 | A3 | A4 | A5 |

FIG.3B

|  | TYPE OF IMAGE | IMAGE TAKING CONDITION | TYPE OF BLOOD VESSEL | BLOOD VESSEL SHAPE | INTRAVASCULAR STRUCTURE | INTERIM CALCULATION RESULT | SHAPE OBTAINING METHOD | PHASE | MAGNITUDE OF MOVEMENTS | RELIABILITY RELATED TO ARTIFACTS |
|---|---|---|---|---|---|---|---|---|---|---|
| RELIABILITIES OF SHAPE | B1 | B2 | B3 | B4 | B5 | B6 | B7 | B8 | B9 | B10 |
| RELIABILITIES OF CHARACTERISTICS | C1 | C2 | C3 |  |  |  |  |  | C4 |  |
| RELIABILITIES OF FLUID | D1 | D2 | D3 |  |  |  |  |  | D4 |  |

FIG.4

| AVERAGE OF MESH SIZES | ≤0.001 [mm³] | | >0.001 [mm³] | | >0.1 [mm³] | | HAVING METHOD M11 ADDED | HAVING METHOD M12 ADDED | HAVING METHOD M13 ADDED | HAVING METHOD M14 ADDED |
|---|---|---|---|---|---|---|---|---|---|---|
| VARIABILITY AMONG MESH SIZES | SKEWNESS >X, LIKELIHOOD >Y | SKEWNESS ≤X, LIKELIHOOD ≤Y | SKEWNESS >X, LIKELIHOOD >Y | SKEWNESS ≤X, LIKELIHOOD ≤Y | SKEWNESS >X, LIKELIHOOD >Y | SKEWNESS ≤X, LIKELIHOOD ≤Y | | | | |
| RELIABILITY A1 | 100 | 60 | 30 | 30 | 10 | 0 | +10 | +10 | +50 | +50 |

FIG.5

| MESH SHAPE | TETRA-HEDRON | HEXA-HEDRON | TRIANGLE | RECTAN-GLE | MESH IS VARIED |
|---|---|---|---|---|---|
| RELIABILITY A2 | 100 | 100 | 90 | 90 | +10 |

FIG.6

| MESH QUALITY | FIRST ORDER | SECOND ORDER | MESH IS VARIED |
|---|---|---|---|
| RELIABILITY A3 | 80 | 100 | +10 |

FIG.7

| TEMPORAL RESOLUTION Δt | $>1.0\times10^{-1}$ [sec] | $\leq1.0\times10^{-1}$ [sec], $>1.0\times10^{-4}$ [sec] | $\leq1.0\times10^{-4}$ [sec] | METHOD M21 | METHOD M22 |
|---|---|---|---|---|---|
| RELIABILITY A4 | 10 | 50 | 100 | +10 | +1 |

FIG.8

| CALCULATION MODEL | 0D MODEL | | FSI | | STRUCTURE-ONLY CALCULATION MODEL | FLUID-ONLY CALCULATION MODEL |
|---|---|---|---|---|---|---|
| DETAILS OF MODEL | CIRCUIT MODELING WHOLE BODY | CIRCUIT MODELING ONLY TARGET BLOOD VESSEL | ALE | IB | | |
| RELIABILITY A5 | 80 | 60 | 100 | 90 | 80 | 80 |

FIG.9

| OBTAINING METHOD | CT | MRI | IVUS | OCT | X-RAY ANGIOGRAPHY APPARATUS (2D) | X-RAY ANGIOGRAPHY APPARATUS (3D) | NO IMAGE IS USED | METHOD M31 | METHOD M32 |
|---|---|---|---|---|---|---|---|---|---|
| RELIABILITY B1 | 80 | 60 | 30 | 30 | 10 | 20 | 0 | +10 | +10 |

FIG.10

| | APPARATUS | | IMAGING PERIOD | | FILTER | | RECONSTRUCTION MATHEMATICAL FUNCTION | |
|---|---|---|---|---|---|---|---|---|
| WHEN USING CT | APPARATUS Q11 | APPARATUS Q12 | >125 msec | ≤125 msec | FILTER R1 | | MATHEMATICAL FUNCTION T1 | |
| IMAGE TAKING CONDITION | 30 | 20 | | | +5 | | +1 | |
| RELIABILITY B2 | | | 10 | 0 | | | | |
| WHEN USING MR | APPARATUS | | IMAGING PERIOD | | STATIC MAGNETIC FIELD | | | |
| IMAGE TAKING CONDITION | APPARATUS Q21 | APPARATUS Q22 | >30 min | ≤30 min | 8T | | | |
| RELIABILITY B2 | 30 | 20 | 10 | 0 | +1 | | | |
| WHEN USING IVUS | APPARATUS | | RETRACTION SPEED | | ROTATION SPEED | | | |
| IMAGE TAKING CONDITION | APPARATUS Q31 | APPARATUS Q32 | <1.5 mm/sec | ≥1.5 mm/sec | >20 frames/sec | <20 frames/sec, ≥10 rames/sec | <10 frames/sec | |
| RELIABILITY B2 | 30 | 20 | 10 | 0 | 0 | 10 | 0 | |
| WHEN USING OCT | APPARATUS | | RETRACTION SPEED | | ROTATION SPEED | | | |
| IMAGE TAKING CONDITION | APPARATUS Q41 | APPARATUS Q42 | <20 mm/sec | ≥20 mm/sec | >100 frames/sec | <100 frames/sec, ≥50 frames/sec | <50 frames/sec | |
| RELIABILITY B2 | 30 | 20 | 15 | 0 | 0 | 20 | 0 | |

| TYPE OF BLOOD VESSEL | #1 | #2 | #3 | #4 | #5 | #6 | #7 | #8 | #9 | #10 | #11 | #12 | #13 | #14 | #15 |
|---|---|---|---|---|---|---|---|---|---|---|---|---|---|---|---|
| RELIABILITY B3 | 10 | 20 | 20 | 10 | 30 | 30 | 20 | 10 | 50 | 40 | 30 | 20 | 100 | 30 | 30 |

FIG.12

| BLOOD VESSEL SHAPE | >30 [mm] | ≤30 [mm], >10 [mm] | ≤10 [mm], >2.5 [mm] | ≤2.5 [mm] |
|---|---|---|---|---|
| RELIABILITY B4 | 100 | 50 | 30 | 0 |

FIG.13

| INTRAVASCULAR STRUCTURE | NONE | CALCIFICATION | PLAQUE | ARTIFICIAL OBJECT | METHOD M41 |
|---|---|---|---|---|---|
| RELIABILITY B5 | 100 | 30 | 10 | 0 | +10 |

FIG.14

| RELIABILITY B6 | 500% OR MORE OF AVERAGE VALUE OF PUBLISHED REFERENCE VALUES | 150% TO 500% OF AVERAGE VALUE OF PUBLISHED REFERENCE VALUES | 75% TO 150% OF AVERAGE VALUE OF PUBLISHED REFERENCE VALUES | 20% TO 75% OF AVERAGE VALUE OF PUBLISHED REFERENCE VALUES | 20% OR LESS OF AVERAGE VALUE OF PUBLISHED REFERENCE VALUES |
|---|---|---|---|---|---|
| #8 BLOOD VESSEL PRESSURE | 0 | 50 | 100 | 50 | 0 |
| #8 BLOOD VESSEL FIRMNESS | 0 | 50 | 100 | 50 | 0 |
| #8 BLOOD FLOWRATE | 0 | 50 | 100 | 50 | 0 |
| #8 BLOOD VESSEL MOVEMENTS | 0 | 50 | 100 | 50 | 0 |

FIG.15

| | PIXEL-WISE | MODEL-BASED |
|---|---|---|
| RELIABILITY B7 | 90 | 100 |

FIG.16

| PHASE | DIASTOLE (CT) | SYSTOLE (CT) | DIASTOLE (IVUS) | SYSTOLE (IVUS) |
|---|---|---|---|---|
| RELIABILITY B8 | 100 | 80 | 90 | 80 |

FIG.17

| MAGNITUDE OF BLOOD VESSEL MOVEMENTS | <X1 [mm/s] | ≥X1 [mm/s], <X2 [mm/s] | ≥X2 [mm/s] |
|---|---|---|---|
| RELIABILITY B9 | 100 | 90 | 80 |

FIG.18

| ARTIFACTS | NO ARTIFACTS | SOME ARTIFACTS | METHOD M51 |
|---|---|---|---|
| RELIABILITY B10 | 50 | 0 | +10 |

FIG.19

| TYPE OF IMAGE | CT | PHOTON COUNTING CT | MRI | IVUS | OCT | X-RAY ANGIOGRAPHY APPARATUS | PUBLISHED REFERENCE VALUES | GAUSSIAN ESTIMATION METHOD |
|---|---|---|---|---|---|---|---|---|
| RELIABILITY C1 | 10 | 40 | 60 | 30 | 30 | 10 | 1 | 5 |

FIG.20

| | APPARATUS | | IMAGING PERIOD | | FILTER | | DETECTOR |
|---|---|---|---|---|---|---|---|
| WHEN USING CT | | | | | | | |
| IMAGE TAKING CONDITION | APPARATUS Q11 | APPARATUS Q12 | >125 msec | ≤125 msec | FILTER R1 | | PCCT |
| RELIABILITY C2 | 30 | 20 | 10 | 0 | +5 | | +20 |
| WHEN USING MR | | | IMAGING PERIOD | | STATIC MAGNETIC FIELD | | |
| IMAGE TAKING CONDITION | APPARATUS Q21 | APPARATUS Q22 | >30 min | ≤30 min | 8T | | |
| RELIABILITY C2 | 90 | 40 | 30 | 0 | +10 | | |
| WHEN USING IVUS | | | RETRACTION SPEED | | ROTATION SPEED | | |
| IMAGE TAKING CONDITION | APPARATUS Q31 | APPARATUS Q32 | <1.5 mm/sec | ≥1.5 mm/sec | >20 frames/sec | <20 frames/sec, ≥10 rames/sec | <10 frames/sec |
| RELIABILITY C2 | 60 | 30 | 20 | 0 | 0 | 20 | 0 |
| WHEN USING OCT | | | RETRACTION SPEED | | ROTATION SPEED | | |
| IMAGE TAKING CONDITION | APPARATUS Q41 | APPARATUS Q42 | <20 mm/sec | ≥20 mm/sec | >100 frames/sec | <100 frames/sec, ≥50 frames/sec | <50 frames/sec |
| RELIABILITY C2 | 60 | 30 | 30 | 0 | 0 | 40 | 0 |

FIG.21

| TYPE OF BLOOD VESSEL | #1 | #2 | #3 | #4 | #5 | #6 | #7 | #8 | #9 | #10 | #11 | #12 | #13 | #14 | #15 |
|---|---|---|---|---|---|---|---|---|---|---|---|---|---|---|---|
| RELIABILITY C3 | 0 | 5 | 5 | 0 | 5 | 5 | 5 | 0 | 50 | 10 | 5 | 5 | 100 | 5 | 5 |

FIG.22

| PHASE | DIASTOLE (CT) | SYSTOLE (CT) | DIASTOLE (IVUS) | SYSTOLE (IVUS) |
|---|---|---|---|---|
| RELIABILITY C4 | 80 | 50 | 100 | 50 |

FIG.23

| TYPE OF IMAGE, ETC. | PHOTON COUNTING CT | MRI | IVUS | OCT | X-RAY ANGIOGRAPHY APPARATUS | PUBLISHED REFERENCE VALUES | GAUSSIAN ESTIMATION METHOD | BLOOD TEST |
|---|---|---|---|---|---|---|---|---|
| RELIABILITY D1 | 40 | 60 | 30 | 30 | 10 | 1 | 5 | 100 |

FIG.24

| | APPARATUS | | IMAGING PERIOD | | STATIC MAGNETIC FIELD | |
|---|---|---|---|---|---|---|
| WHEN USING MR | APPARATUS Q21 | APPARATUS Q22 | >30 min | ≤30 min | 8T | |
| IMAGE TAKING CONDITION | 20 | 10 | | | | |
| RELIABILITY D2 | | | 5 | 0 | +1 | |
| WHEN USING IVUS | APPARATUS | | RETRACTION SPEED | | ROTATION SPEED | |
| | APPARATUS Q31 | APPARATUS Q32 | <1.5 mm/sec | ≥1.5 mm/sec | >20 frames/sec | <20 frames/sec, ≥10 rames/sec | <10 frames/sec |
| IMAGE TAKING CONDITION | 10 | 0 | | | | |
| RELIABILITY D2 | | | 5 | 0 | 0 | 5 | 0 |
| WHEN USING OCT | APPARATUS | | RETRACTION SPEED | | ROTATION SPEED | |
| | APPARATUS Q41 | APPARATUS Q42 | <20 mm/sec | ≥20 mm/sec | >100 frames/sec | <100 frames/sec, ≥50 frames/sec | <50 frames/sec |
| IMAGE TAKING CONDITION | 10 | 0 | | | | |
| RELIABILITY D2 | | | 5 | 0 | 0 | 5 | 0 |

FIG.25

| TYPE OF BLOOD VESSEL | #1 | #2 | #3 | #4 | #5 | #6 | #7 | #8 | #9 | #10 | #11 | #12 | #13 | #14 | #15 |
|---|---|---|---|---|---|---|---|---|---|---|---|---|---|---|---|
| RELIABILITY D3 | 60 | 70 | 70 | 100 | 80 | 80 | 70 | 60 | 100 | 100 | 80 | 70 | 100 | 80 | 80 |

FIG.26

| PHASE | DIASTOLE (CT) | SYSTOLE (CT) | DIASTOLE (IVUS) | SYSTOLE (IVUS) |
|---|---|---|---|---|
| RELIABILITY D4 | 80 | 70 | 100 | 90 |

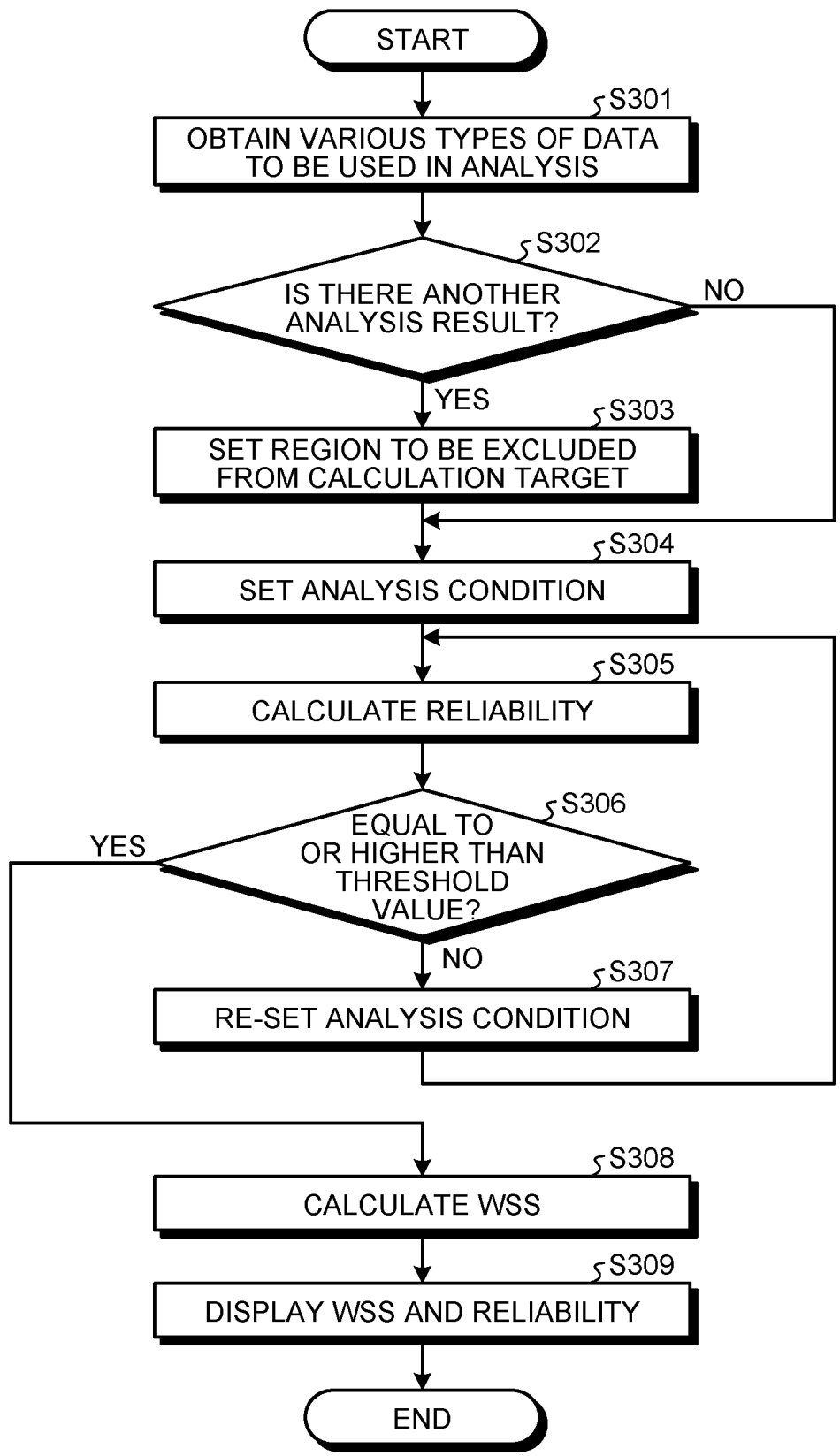

MEDICAL INFORMATION PROCESSING APPARATUS, MEDICAL INFORMATION PROCESSING SYSTEM, AND MEDICAL INFORMATION PROCESSING METHOD

CROSS-REFERENCE TO RELATED APPLICATIONS

This application is based upon and claims the benefit of priority from Japanese Patent Application No. 2020-186647, filed on Nov. 9, 2020; the entire contents of which are incorporated herein by reference.

FIELD

Embodiments described herein relate generally to a medical information processing apparatus, a medical information processing system, and a medical information processing method.

BACKGROUND

Conventionally, as a technique for assisting disease diagnosing processes, treatment planning processes, and the like related to the heart or a blood vessel, a technique is known by which an index value related to a blood flow is calculated so as to be presented to a user such as a medical doctor. Examples of the index value include Wall Shear Stress (WSS) in the blood vessel and Fractional Flow Reserve (FFR).

BRIEF DESCRIPTION OF THE DRAWINGS

FIG. 2 is a flowchart illustrating a processing procedure of processes performed by processing functions included in processing circuitry of the medical information processing apparatus according to the first embodiment;

FIG. 3A is a table illustrating an example of a reliability calculating method according to the first embodiment;

FIG. 3B is a table illustrating another example of the reliability calculating method according to the first embodiment;

FIG. 4 is a table illustrating yet another example of the reliability calculating method according to the first embodiment;

FIG. 5 is a table illustrating yet another example of the reliability calculating method according to the first embodiment;

FIG. 6 is a table illustrating yet another example of the reliability calculating method according to the first embodiment;

FIG. 7 is a table illustrating yet another example of the reliability calculating method according to the first embodiment;

FIG. 8 is a table illustrating yet another example of the reliability calculating method according to the first embodiment;

FIG. 9 is a table illustrating yet another example of the reliability calculating method according to the first embodiment;

FIG. 10 is a table illustrating yet another example of the reliability calculating method according to the first embodiment;

FIG. 12 is a table illustrating yet another example of the reliability calculating method according to the first embodiment;

FIG. 13 is a table illustrating yet another example of the reliability calculating method according to the first embodiment;

FIG. 14 is a table illustrating yet another example of the reliability calculating method according to the first embodiment;

FIG. 15 is a table illustrating yet another example of the reliability calculating method according to the first embodiment;

FIG. 16 is a table illustrating yet another example of the reliability calculating method according to the first embodiment;

FIG. 17 is a table illustrating yet another example of the reliability calculating method according to the first embodiment;

FIG. 18 is a table illustrating yet another example of the reliability calculating method according to the first embodiment;

FIG. 19 is a table illustrating yet another example of the reliability calculating method according to the first embodiment;

FIG. 20 is a table illustrating yet another example of the reliability calculating method according to the first embodiment;

FIG. 21 is a table illustrating yet another example of the reliability calculating method according to the first embodiment;

FIG. 22 is a table illustrating yet another example of the reliability calculating method according to the first embodiment;

FIG. 23 is a table illustrating yet another example of the reliability calculating method according to the first embodiment;

FIG. 24 is a table illustrating yet another example of the reliability calculating method according to the first embodiment;

FIG. 25 is a table illustrating yet another example of the reliability calculating method according to the first embodiment;

FIG. 26 is a table illustrating yet another example of the reliability calculating method according to the first embodiment;

FIG. 28 is a flowchart illustrating another processing procedure of processes performed by the processing functions included in the processing circuitry of the medical information processing apparatus according to the second embodiment.

DETAILED DESCRIPTION

Exemplary embodiments of a medical information processing apparatus, a medical information processing system, and a medical information processing method will be explained in detail, with reference to the accompanying drawings.

Figure 1:
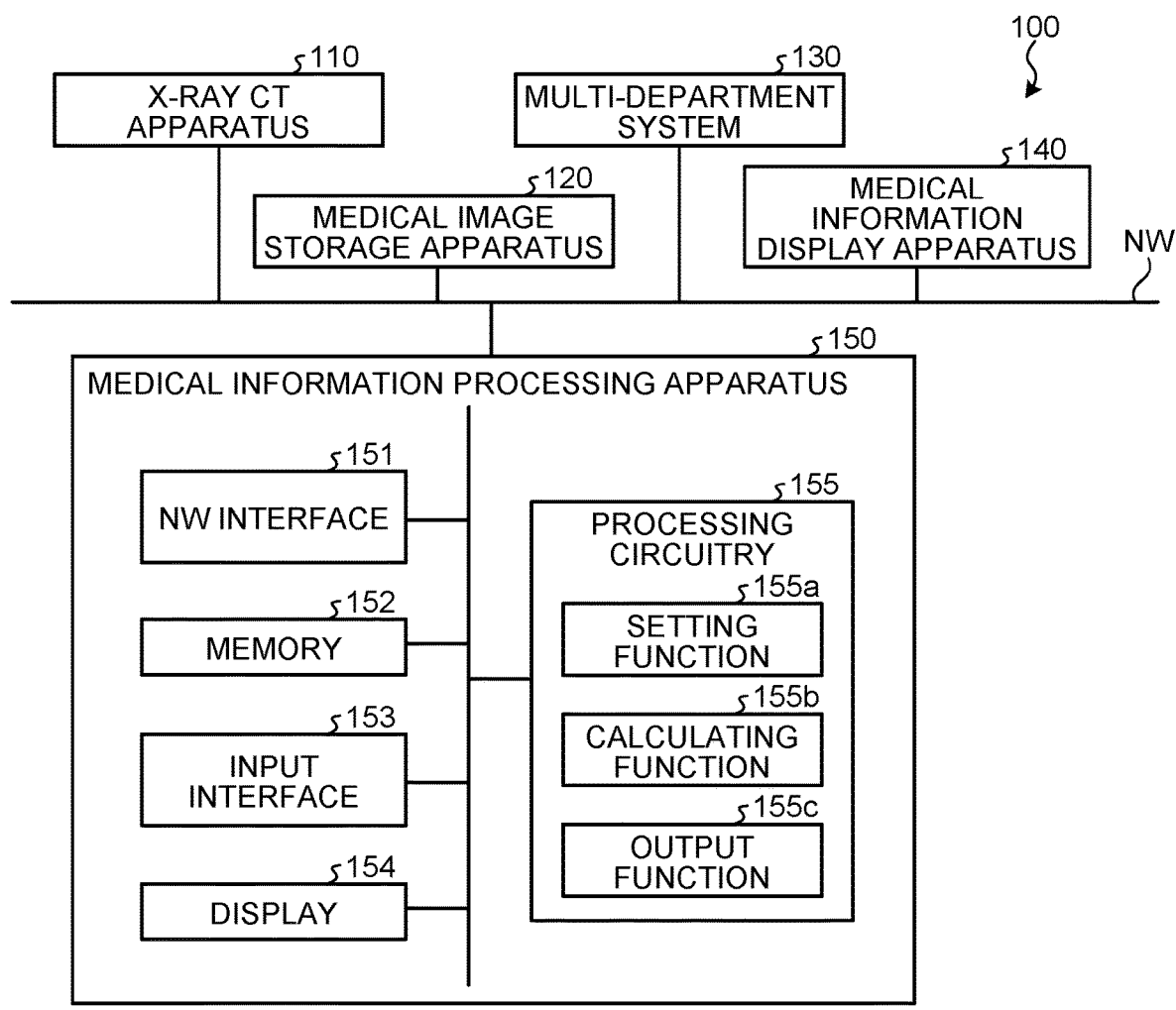
FIG. 1 is a diagram illustrating exemplary configurations of a medical information processing system and a medical information processing apparatus according to a first embodiment.

FIG. 1 is a diagram illustrating exemplary configurations of a medical information processing system and a medical information processing apparatus according to a first embodiment.

For example, as illustrated in FIG. 1, a medical information processing system 100 according to the present embodiment includes an X-ray Computed Tomography (CT) apparatus 110, a medical image storage apparatus 120, a multi-department system 130, a medical information display apparatus 140, and a medical information processing apparatus 150. In this situation, the apparatuses, the devices, and the systems are communicably connected to one another via a network NW.

The X-ray CT apparatus 110 is configured to generate a CT image related to an examined subject (hereinafter, "patient"). More specifically, the X-ray CT apparatus 110 is configured to acquire projection data expressing a distribution of X-rays that have passed through the patient, by moving an X-ray tube and an X-ray detector to turn on a circular trajectory around the patient. Further, on the basis of the acquired projection data, the X-ray CT apparatus 110 generates the CT image.

Although FIG. 1 illustrates the example in which the medical information processing system 100 includes the X-ray CT apparatus 110, the medical information processing system 100 may include a modality of a different type from the X-ray CT apparatus 110. For example, in place of or in addition to the X-ray CT apparatus 110, the medical information processing system 100 may include one or more medical image diagnosis apparatuses such as a Magnetic Resonance Imaging (MRI) apparatus, an ultrasound diagnosis apparatus, a Positron Emission Tomography (PET) apparatus, a Single Photon Emission Computed Tomography (SPECT) apparatus, and/or the like.

The medical image storage apparatus 120 is configured to store therein various types of medical images related to the patient. More specifically, the medical image storage apparatus 120 is configured to obtain the CT image from the X-ray CT apparatus 110 via the network NW and to save and store the CT image in a storage circuit provided in the medical image storage apparatus 120. For example, the medical image storage apparatus 120 may be realized by using a computer device such as a server or a workstation. Alternatively, for example, the medical image storage apparatus 120 may be realized by using a Picture Archiving and Communication System (PACS) or the like so as to store the CT image therein in a format compliant with Digital Imaging and Communications in Medicine (DICOM).

The multi-department system 130 includes various types of systems such as a Hospital Information System (HIS), a Radiology Information System (RIS), a diagnosis report system, a Laboratory Information System (LIS), a rehabilitation department system, a dialysis department system, a surgery department system, and/or the like. The medical information processing system 100 is connected to each of these systems so that various types of information are transmitted to and received from one another. For example, the medical information processing system 100 is configured to transmit and receive patient information, medical examination information, treatment information, information related analysis results, and/or the like to and from the systems included in the multi-department system 130.

The medical information display apparatus 140 is configured to display various types of medical information related to the patient. More specifically, via the network NW, the medical information display apparatus 140 is configured to obtain the CT image acquired from the patient by the X-ray CT apparatus 110 and medical information such as a result of an analyzing process performed by the medical information processing apparatus 150 so as to display the obtained image and information on a display monitor provided therein. For example, the medical information display apparatus 140 is realized by using a computer device such as a work station, a personal computer, or a tablet terminal.

The medical information processing apparatus 150 is an analyzing apparatus configured to perform the analyzing process to calculate an index value related to a blood flow of the patient. For example, the medical information processing apparatus 150 is configured to obtain the CT image from either the X-ray CT apparatus 110 or the medical image storage apparatus 120, via the network NW. Further, the medical information processing apparatus 150 is configured to obtain various types of information such as a blood test result and a medical record from the multi-department system 130, via the network NW. After that, the medical information processing apparatus 150 is configured to calculate an index value such as WSS or FFR by performing the analyzing process on the basis of the various types of medical information obtained via the network NW. Furthermore, the medical information processing apparatus 150 is configured to calculate a reliability with respect to the index value. For example, the medical information processing apparatus 150 is realized by using a computer device such as a server or a workstation.

For example, the medical information processing apparatus 150 includes a network (NW) interface 151, a memory 152, an input interface 153, a display 154, and processing circuitry 155.

The NW interface 151 is configured to control communication and transfer of various types of data transmitted and received between the medical information processing apparatus 150 and the other apparatuses and devices connected via the network NW. More specifically, the NW interface 151 is connected to the processing circuitry 155 and is configured to output the data received from the other apparatuses and devices to the processing circuitry 155 and to transmit the data output from the processing circuitry 155 to any of the other apparatuses and devices. For example, the NW interface 151 is realized by using a network card, a network adaptor, a Network Interface Controller (NIC), or the like.

The memory 152 is configured to store therein various types of data and various types of computer programs (hereinafter, simply "programs"). More specifically, the memory 152 is connected to the processing circuitry 155 and is configured to store therein the data input thereto from the processing circuitry 155 and to read and output any of the stored data to the processing circuitry 155. For example, the memory 152 is realized by using a semiconductor memory element such as a Random Access Memory (RAM) or a flash memory, or a hard disk, an optical disk, or the like.

For example, the memory 152 has stored therein settings about a calculation condition, a shape, characteristics, and a fluid regarding an analyzing process performed by the processing circuitry 155. Further, the memory 152 has stored therein various types of medical information obtained from the X-ray CT apparatus 110, the medical image storage apparatus 120, the multi-department system 130, and the like via the network NW. Further, the memory 152 has stored therein programs used by the circuits included in the medical information processing apparatus 150 to realize functions thereof. The memory 152 is an example of a memory.

The input interface 153 is configured to receive various types of input operations from a user, to convert the received input operations into electrical signals, and output the electrical signals to the processing circuitry 155. For example, the input interface 153 is realized by using a mouse, a keyboard, a trackball, a switch, a button, a joystick, a touchpad on which input operations can be performed by touching an operation surface thereof, a touch screen in which a display screen and a touchpad are integrally formed, a contactless input circuit using an optical sensor, an audio input circuit, and/or the like. Alternatively, the input interface 153 may be configured by using a tablet terminal or the like capable of wirelessly communicating with the main body of the medical information processing apparatus 150. Further, the input interface 153 may be a circuit configured to receive the input operations from the user through motion capture. In one example, the input interface 153 may be able to receive, as the input operations, body movements, a line of sight, and/or the like of the user, by processing a signal obtained via a tracker or an image acquired of the user. Furthermore, the input interface 153 does not necessarily have to include one or more physical operation component parts such as a mouse, a keyboard, and/or the like. Possible examples of the input interface 153 include, for instance, an electrical signal processing circuit configured to receive electrical signals corresponding to input operations from an external input device provided separately from the medical information processing apparatus 150 and to output the electrical signals to the processing circuitry 155.

The display 154 is configured to display various types of information. For example, the display 154 is configured to display a Graphical User Interface (GUI) used for receiving instructions from the user via the input interface 153. The display 154 is realized by using a liquid crystal display device, a Cathode Ray Tube (CRT) display device, a touch panel, or the like.

Although FIG. 1 illustrates the example in which the medical information processing apparatus 150 includes the display 154, the medical information processing apparatus 150 may include a projector in place of or in addition to the display 154. Under control of the processing circuitry 155, the projector is capable of projecting an image on a screen, a wall, a floor, the body surface of the patient, or the like. In one example, the projector is also capable of projecting an image on an arbitrary plane, object, space, or the like by performing projection mapping.

The processing circuitry 155 is configured to control the entirety of the medical information processing apparatus 150. For example, the processing circuitry 155 is configured to perform various types of processes in accordance with the input operations received from the user via the input interface 153. For example, the processing circuitry 155 is configured to receive an input of the data transmitted from another apparatus or device through the NW interface 151 and to store the input data into the memory 152. Further, for example, the processing circuitry 155 is configured to output the data input from the memory 152 to the NW interface 151, so as to transmit the data to another apparatus or device. Further, for example, the processing circuitry 155 is configured to cause the display 154 to display the data input from the memory 152.

The exemplary configurations of the medical information processing system 100 and the medical information processing apparatus 150 according to the present embodiment have thus been explained. For example, the medical information processing system 100 and the medical information processing apparatus 150 according to the present embodiment are installed in a medical facility such as a hospital or a clinic and are configured to assist the user such as a medical doctor in performing diagnosing processes and making treatment plans in relation to diseases of the heart or a blood vessel.

More specifically, the processing circuitry 155 included in the medical information processing apparatus 150 is configured to perform the analyzing process on the basis of the various types of medical information obtained from the X-ray CT apparatus 110, the medical image storage apparatus 120, the multi-department system 130, and/or the like, to calculate the index value related to a blood flow such as WSS or FFR, and to present the calculated index value to the user. For example, the processing circuitry 155 is configured to transmit the calculated index value to the medical information display apparatus 140 so that the medical information display apparatus 140 displays the index value. In another example, the processing circuitry 155 is also capable of causing the display 154 to display the index value. The user is thus able to refer to the index value related to the blood flow of the patient, as reference information for performing a diagnosing process, making a treatment plan, or the like.

Further, by calculating a reliability with respect to the index value related to the blood flow, the processing circuitry 155 is configured to make the index value easier to use. In the following sections, functions included in the processing circuitry 155 will be explained. For example, as illustrated in FIG. 1, the processing circuitry 155 is configured to execute a setting function 155*a*, a calculating function 155*b*, and an output function 155*c*. The setting function 155*a* is an example of a setting unit. The calculating function 155*b* is an example of a calculating unit. The output function 155*c* is an example of an output unit.

The setting function 155*a* is configured to determine an analysis condition. Under the analysis condition determined by the setting function 155*a*, the calculating function 155*b* is configured to perform the analyzing process to calculate the index value related to the blood flow. Further, the calculating function 155*b* is configured to calculate the reliability, with respect to the index value calculated under the analysis condition determined by the setting function 155*a*. The output function 155*c* is configured to output the index value and the reliability calculated by the calculating function 155*b*. For example, the output function 155*c* is configured to control the NW interface 151 so as to transmit the index value and the reliability to the medical information display apparatus 140 and is configured to cause the display 154 to display the index value and the reliability.

The processing circuitry 155 described above is realized by using a processor, for example. In that situation, the processing functions described above are stored in the memory 152 in the form of computer-executable programs. Further, by reading and executing the programs stored in the memory 152, the processing circuitry 155 is configured to realize the functions corresponding to the programs. In other words, the processing circuitry 155 that has read the programs has the processing functions illustrated in FIG. 1.

In an example, the processing circuitry 155 may be structured by combining together a plurality of independent processors, so that the processing functions are realized as a result of the processors executing the programs. Further, the processing functions included in the processing circuitry 155 may be realized as distributed among or integrated into one or more processing circuits as appropriate. Further, the processing functions included in the processing circuitry 155 may be realized by a combination of hardware (i.e., circuitry) and software. Further, although the example was explained above in which the programs corresponding to the processing functions are stored in the single memory (i.e., the memory 152), possible embodiments are not limited to this example. For instance, the programs corresponding to the processing functions may be stored in a plurality of storage circuits in a distributed manner, so that the processing circuitry 155 reads and executes the programs from the storage circuits.

Next, an outline of a series of processes performed by the medical information processing apparatus 150 will be explained with reference to FIG. 2. FIG. 2 is a flowchart illustrating a processing procedure of the processes performed by the processing functions included in the processing circuitry 155 of the medical information processing apparatus 150 according to the first embodiment. With reference to FIG. 2, WSS will be explained as an index value related to the blood flow.

At first, the calculating function 155*b* obtains various types of data to be used in an analysis (step S101). For example, the calculating function 155*b* obtains a coronary artery CT image of the patient from either the X-ray CT apparatus 110 or the medical image storage apparatus 120, via the NW interface 151.

Subsequently, the setting function 155*a* sets an analysis condition (step S102). For example, the analysis condition used for calculating the WSS is represented by the settings about the calculation condition, the shape, the characteristics, and the fluid. The calculation condition may be, for example, the size of a mesh, a calculation model, or the like. The shape may be, for example, the shape of an outline or a centerline of the blood vessel, or an obtaining method thereof. The characteristics may be, for example, information about the composition or the firmness of the heart, a blood vessel, a peripheral tissue, plaque in a blood vessel, and/or the like, or an obtaining method thereof. The fluid may be, for example, fluid information such as a flowrate or pressure of blood or an obtaining method thereof. The settings about the calculation condition, the shape, the characteristics, and the fluid are stored in the memory 152. The setting function 155*a* is able to determine the analysis condition by reading the settings from the memory 152.

In this situation, the memory 152 may store therein only one setting each or may store therein two or more settings each, with respect to the calculation condition, the shape, the characteristics, and the fluid. For example, when there is only one calculation model that is executable by the calculating function 155*b*, the memory 152 has stored therein the calculation model as a setting about the calculation condition. Further, the setting function 155*a* determines the calculation model read from the memory 152 as an analysis condition.

In contrast, when there are a plurality of calculation models that are executable by the calculating function 155*b*, the memory 152 has stored therein the plurality of calculation models as settings about the calculation condition. Further, the setting function 155*a* selects one of the plurality of calculation models stored in the memory 152 and determines the selected calculation model as an analysis condition. In other words, when the memory 152 has stored therein a plurality of settings with respect to at least one of the calculation condition, the shape, the characteristics, and the fluid, the setting function 155*a* is configured to select one of the plurality of settings and to determine the selected setting as the analysis condition.

Subsequently, the calculating function 155*b* calculates the WSS and the reliability under the analysis condition determined by the setting function 155*a* (step S103). In other words, the calculating function 155*b* performs the analysis according to the analysis condition and calculates the WSS. For example, from the coronary artery CT image of the patient, the calculating function 155*b* calculates a value of the WSS in a target region, by implementing a known method using a finite element method based on Computational Fluid Dynamics (CFD), machine learning, or the like. For example, when calculating the index value on the basis of CFD, the calculating function 155*b* calculates WSS in each of different positions in the coronary artery by performing a fluid analysis that uses, together with blood vessel shape data, conditions such as physical property values of blood (e.g., hematocrit, viscosity and/or density of blood), an elasticity value of a blood vessel wall, a condition of a repetitive calculation (a repetition maximum value, a relaxation coefficient, a tolerance value for a residual, and/or the like of the repetitive calculation), initial values for the analysis (initial values of a blood flow volume, pressure, fluid resistance, and/or pressure boundary). Further, by evaluating the analysis condition, the calculating function 155*b* calculates the reliability of the WSS values calculated under the analysis condition. Details of the calculation of the reliability will be explained later.

After that, the output function 155*c* causes the display 154 to display the WSS and the reliability calculated by the calculating function 155*b* (step S104). For example, the output function 155*c* generates a three-dimensional image of the coronary artery, by three-dimensionally reconstructing a blood vessel region of the coronal artery in the coronary artery CT image. In one example, the output function 155*c* generates a Volume Rendering (VR) image, a Surface Rendering (SR) image, a Curved Planar Reconstruction (CPR) image, a Multi Planar Reconstruction (MPR) image, a Stretched Multi Planar Reconstruction (SPR) image, or the like. Further, the output function 155*c* generates a display image in which a WSS value is assigned to each of different positions in the three-dimensional image. For example, the output function 155*c* generates a color image in which a color corresponding to the WSS value is assigned to each of the different positions in the three-dimensional image and causes the display 154 to display the color image.

Further, the output function 155*c* causes the calculated reliability to be displayed. For example, the output function 155*c* causes the display 154 to display a numerical value representing the reliability. In another example, the output function 155*c* generates a display image in which the reliability value is assigned to each of the different positions in the three-dimensional image and causes the display 154 to display the display image.

As illustrated in FIG. 2, when the WSS and the reliability are displayed, the user is able to perform a diagnosing process and to make a treatment plan, by referencing the WSS. Further, because it is possible to judge how reliable the WSS is on the basis of the reliability, the WSS is easier to use. For example, when the WSS value implies the presence of a disease, and the reliability thereof is high, the user is able to understand more clearly the necessity for the treatment of the disease.

Next, a method for calculating reliabilities will be explained further in detail, with reference to FIGS. 3A to 26. FIGS. 3A to 26 are tables and a drawing illustrating examples of the reliability calculating method according to the first embodiment.

For example, as illustrated in FIG. 3A, the calculating function 155b calculates a reliability A1 related to the size of a mesh, a reliability A2 related to the shape of the mesh, a reliability A3 related to quality of the mesh, a reliability A4 related to temporal resolution, and a reliability A5 related to a calculation model and further calculates the reliability of the calculation condition on the basis of the reliabilities A1 to A5. Further, as illustrated in FIG. 3B, the calculating function 155b calculates, from a viewpoint of how reliable the shape is, a reliability B1 related to the type of an image, a reliability B2 related to an image taking condition, a reliability B3 related to the type of the blood vessel, a reliability B4 related to the shape of the blood vessel, a reliability B5 related to an intravascular structure, a reliability B6 related to an interim calculation result, a reliability B7 related to a shape obtaining method, a reliability B8 related to a phase, a reliability B9 related to the magnitude of movements, and a reliability B10 related to artifacts and further calculates the reliability of the shape on the basis of the reliabilities B1 to B10. Similarly, the calculating function 155b calculates, from a viewpoint of how reliable the characteristics are, a reliability C1 related to the type of an image, a reliability C2 related to an image taking condition, a reliability C3 related to the type of the blood vessel, a reliability C4 related to a phase and further calculates the reliability of the characteristics on the basis of the reliabilities C1 to C4. Similarly, the calculating function 155b calculates, from a viewpoint of how reliable the fluid information is, a reliability D1 related to the type of an image, a reliability D2 related to an image taking condition, a reliability D3 related to the type of the blood vessel, and a reliability D4 related to a phase and further calculates the reliability of the fluid on the basis of the reliabilities D1 to D4. After that, on the basis of the reliability of the calculation condition, the reliability of the shape, the reliability of the characteristics, and the reliability of the fluid, the calculating function 155b calculates the reliability (a total reliability) of the WSS.

The reliability of the calculation condition illustrated in FIG. 3A is an example of the first reliability related to the calculation condition. The reliability of the shape illustrated in FIG. 3B is an example of the second reliability related to the shape. The reliability of the characteristics illustrated in FIG. 3B is an example of the third reliability related to the characteristics. The reliability of the fluid illustrated in FIG. 3B is an example of the fourth reliability related to the fluid.

FIG. 4 illustrates an example of a method for calculating the reliability A1 related to the size of the mesh. For example, to calculate the WSS or the like by using the finite element method, the shape or the fluid is decomposed into the mesh, for example. To determine the size of the mesh, in many situations, an average or a variance of the mesh sizes is determined in advance, so as to divide the whole into sections so as to be closer to the determined value. In this situation, generally speaking, the smaller the size of the mesh (the average) is and the smaller the variance (variability) is, the higher is the precision level of the analysis. Accordingly, the calculating function 155b is able to calculate the reliability A1, on the basis of the average or the variance of the mesh sizes being set.

For example, the memory 152 has stored therein a plurality of settings each obtained by combining together an average and variability of the mesh sizes, as settings about the calculation condition. In one example, as illustrated in FIG. 4, the memory 152 has stored therein six settings such as "Average: ≤0.001 mm3, Skewness: >X, Likelihood: >Y", "Average: ≤0.001 mm3, Skewness: ≤X, Likelihood: ≤Y", "Average: >0.001 mm3, Skewness: >X, Likelihood: >Y", "Average: >0.001 mm3, Skewness: ≤X, Likelihood: ≤Y", "Average: >0.1 mm3, Skewness: >X, Likelihood: >Y" and "Average: >0.1 mm3, Skewness: ≤X, Likelihood: ≤Y". In FIG. 4, X and Y each denote a predetermined threshold value. Further, the setting function 155a selects one of the six settings stored in the memory 152 and determines the selected setting as an analysis condition. After that, the calculating function 155b calculates the reliability A1 on the basis of the analysis condition determined by the setting function 155a. For example, when the average of the mesh size is smaller than 0.001 mm3, while the skewness is larger than X, and the likelihood is larger than Y, the calculating function 155b calculates that the "reliability A1=100".

Although FIG. 4 illustrates the example using the size of the mesh, possible embodiments are not limited to the size. It is possible to use expressions related to a volume, a surface area, a weight, the length of each side of the mesh, or the like. Further, as for the volume, the surface area, and the weight, it is acceptable to use, instead of the average, a maximum value among all the meshes, a minimum value among all the meshes, a median value of all the meshes, or the like. As for the length of each side of the mesh, it is acceptable to use, instead of the average, an average value of the maximum values of the meshes, a median value of the maximum values of the meshes, an average value of the minimum values of the meshes, a median value of the minimum values of the meshes, an average value of average values of the meshes, a median value of the average values of the meshes, or the like. Similarly, although FIG. 4 illustrates the example in which the variability among the mesh sizes is expressed with the skewness and the likelihood, possible embodiments are not limited to this example as long as the index is related to the variability among the mesh sizes, and it is possible to apply various modifications. For example, a variance may be used as the variability among the mesh sizes.

Additionally, various types of contrivance may be applied to the setting of the mesh size. In consideration of these circumstances, the calculating function 155b may increase the score of the reliability A1.

For example, medical images such as the CT image may be impacted by movements such as the respiration or the pulse of the patient, in some situations. To cope with this, it is possible to use a method by which a region having complicated movements is detected from a medical image in advance, so as to set a finer mesh for the region. In this situation, the region having complicated movements may be, for example, a region that is suddenly compressed, suddenly stretched, or suddenly bent. For example, it is possible to detect the region having complicated movements, by taking images over the course of time so as to acquire a plurality of frames of CT images and further making a comparison between the frames. In other words, the calculating function 155b may be configured to detect the region having large movements on the basis of the medical images in the time series so as to calculate the reliability related to the shape of the mesh on the basis of the detection result. Alternatively, it is also possible to set, in advance, a blood vessel branch or a region having complicated movements on the basis of past findings. In the following sections, this method for setting the mesh will be referred to as a method M11. By setting the mesh while using the method M11, it is possible to improve the precision level of the analysis while keeping the calculation amount of the analysis small.

Further, it is also possible to use another method by which a region having complicated movements is detected from a medical image, so that a degree of complication of the movements is calculated in each of different positions, so as to vary the mesh size depending on the degree of complication. In the following sections, this method for setting the mesh will be referred to as a method M12. By setting the mesh while using the method M12, it is possible to improve the precision level of the analysis while keeping the calculation amount of the analysis small.

Further, as for the mesh set with respect to a fluid such as blood, it is possible to use a method by which the mesh size is varied while taking the state of a flow into account. For example, it is possible to calculate an occurrence probability of a turbulent flow in each of different positions inside a blood vessel on the basis of the blood vessel shape such as the thickness of the blood vessel or fluid information such as viscosity or a flowrate of the blood, so as to set a finer mesh with respect to a region having a higher possibility of the occurrence of a turbulent flow. In other words, the calculating function 155b may be configured to detect a region that is more likely to have a turbulent flow and to calculate the reliability related to the mesh size on the basis of the detection result. In the following sections, this method for setting the mesh will be referred to as a method M13. By setting the mesh while using the method M13, it is possible to improve the precision level of the analysis while keeping the calculation amount of the analysis small.

It is also possible to use yet another method by which a mesh is repeatedly set until the analysis result converges. For example, an analysis is performed at first by setting a coarse mesh, and analyses are repeatedly performed while gradually making the mesh finer, to keep making the mesh finer until the difference in the analysis result for each repetition becomes smaller than an arbitrary threshold value. More specifically, every time WSS is calculated by re-setting the mesh and performing an analysis, the difference from the most recently calculated WSS is calculated, so as to repeatedly re-set the mesh and perform an analysis until the difference becomes smaller than the threshold value. In the following sections, this method for setting the mesh will be referred to as a method M14. By setting the mesh while using the method M14, it is possible to improve the precision level of the analysis. When the method by which the mesh is repeatedly set is used, there is no need to keep re-setting the mesh and repeat the analysis with respect to the entire analysis system. For example, while re-setting the mesh and repeating the analysis, a region may be specified in which the difference in the analysis result for each repetition has become smaller than the arbitrary threshold value. Accordingly, it is acceptable to skip re-setting the mesh with respect to the specified region having the small difference in the analysis result, i.e., the converged region, so as to re-set the mesh in the subsequent repetitive calculation only with respect to the regions other than the converged region.

For example, as illustrated in FIG. 4, with regard to setting the mesh size, the calculating function 155b increases the score by "+10" when the method M11 is added, increases the score by "+10" when the method M12 is added, increases the score by "+50" when the method M13 is added, and increases the score by "+50" when the method M14 is added. For example, the memory 152 has stored therein five settings such as "having the method M11 added", "having the method M12 added", "having the method M13 added", "having the method M14 added", and "having no additional method", as settings about the calculation condition. Further, the setting function 155a selects one of the five settings stored in the memory 152 and determines the selected setting as an analysis condition. After that, the calculating function 155b calculates the reliability A1 on the basis of the analysis condition determined by the setting function 155a. For example, when an average of the mesh sizes is larger than 0.1 mm3, while the skewness is larger than X, the likelihood is larger than Y, and the method M13 is added, the calculating function 155b calculates that the "reliability A1=10+50=60".

In this situation, the calculating function 155b may set an upper limit to the reliability A1. For example, while the upper limit is set to "100", when the total value exceeds "100" because of a score increase due to one of the methods M11 to M14, the calculating function 155b calculates the reliability A1 as "100". In other words, the calculating function 155b calculates a value in the range of "0 to 100" as the reliability A1.

Further, although FIG. 4 illustrates the example in which the reliabilities corresponding to the settings are represented by specific numerical values, those numerical values are merely examples and may arbitrarily be adjusted. The reliabilities corresponding to the settings may empirically be determined, may be determined on the basis of the number of research articles or an impact factor, or may be set in advance by using other methods. Further, the reliabilities corresponding to the settings may be adjusted as appropriate, according to an input operation performed by the user or a machine learning method. Further, the reliabilities do not necessarily have to be numerical values. For example, the reliabilities may be expressed with ranks or classifications such as "high/medium/low" or "sufficient/insufficient".

Further, the calculating function 155b may calculate a reliability with respect to each of different positions in the target region or may calculate a single reliability with respect to the entire target region. When calculating reliabilities with respect to the different positions, the calculating function 155b may calculate, for example, a spatial distribution of reliability A1 values in a blood vessel region included in the CT image. When calculating a single reliability, for example, the calculating function 155b may calculate a reliability with respect to each of the different positions in the blood vessel region included in the CT image, so as to calculate a representative value such as an average value or the smallest value, as the reliability A1.

FIG. 5 illustrates an example of a method for calculating the reliability A2 related to the shape of the mesh. For example, when a three-dimensional mesh is to be set, it is possible to select a tetrahedral mesh, a hexahedral mesh, or the like. Further, for example, when a two-dimensional mesh is to be set, it is possible to select a triangular mesh, a rectangular mesh, or the like. Further, a two-dimensional mesh may be set with a CT image (volume data) in some situations. For example, in some situations, a blood vessel may be segmented from a CT image, so as to perform an analysis by setting a two-dimensional mesh along the inner wall of the blood vessel. Further, it is known that the precision level of the analysis may vary depending on the shape of the mesh set in this manner. Accordingly, the calculating function 155b is able to calculate the reliability A2 on the basis of the shape of the mesh being set.

For example, the memory 152 has stored therein a plurality of mesh shapes, as settings about the calculation condition. In one example, as illustrated in FIG. 5, the memory 152 has stored therein four settings such as "tetrahedron", "hexahedron", "triangle", "octahedron", "dodecahedron", and "rectangle". Further, the setting function 155a selects one of the four settings stored in the memory 152 and determines the selected setting as an analysis condition.

Further, the calculating function 155b calculates the reliability A2 on the basis of the analysis condition determined by the setting function 155a. For example, when a "rectangle" is determined as an analysis condition, the calculating function 155b calculates that the "reliability A2=90".

Further, the calculating function 155b may increase the score of the reliability A2. For example, when the mesh is varied for each region, the calculating function 155b may increase the score by "+10". More specifically, for a region having complicated movements or a region having a high possibility of the occurrence of a turbulent flow, a mesh shape having a high precision level of analysis may be selected, whereas for the other regions, a mesh shape having a smaller calculation load may be selected. It is possible to detect the region having complicated movements, for example, by taking CT images in a time series and identifying a region having a large moving amount regarding the position of a blood vessel wall or a large change amount with respect to the moving direction, per unit time period. In other words, the calculating function 155b may be configured to detect the region having the large movements on the basis of the medical images in the time series, so as to calculate the reliability related to the mesh shape on the basis of the detection result. In contrast, the region having a high possibility of the occurrence of a turbulent flow may be, for example, a blood vessel branching part or a plaque part, which has a wall surface orthogonal to the blood flow direction. It is possible to detect the region having a high possibility of the occurrence of a turbulent flow, by storing a shape model of regions having a high possibility of the occurrence of a turbulent flow in advance, dividing the blood vessel into sections, and identifying a region in which the divided sections each have a high degree of similarity to the shaped model stored in advance. In other words, the calculating function 155b may be configured to detect the region in which a turbulent flow is likely to occur and to calculate the reliability related to the mesh shape on the basis of the detection result. Further, even when the mesh shape is the same, the calculating function 155b may set mutually-different reliabilities between when the setting corresponds to the shape of a blood vessel or the like and when the setting corresponds to a fluid such as blood.

Further, similarly to the example of the reliability A1, the calculating function 155b may set an upper limit to the reliability A2. Also, similarly to the example in FIG. 4, although FIG. 5 illustrates the example in which the reliabilities corresponding to the settings are represented by specific numerical values, those numerical values are merely examples and may be modified in various manners. Further, the calculating function 155b may calculate a reliability A2 with respect to each of different positions in the target region or may calculate a single reliability A2 with respect to the entire target region. The same applies to any of the various types of reliabilities explained later.

FIG. 6 illustrates an example of a method for calculating the reliability A3 related to quality of the mesh. For example, known examples of the quality of the mesh are represented by first-order meshes and meshes of second or higher order. For example, a first-order mesh of a tetrahedron uses four vertices of the tetrahedron as calculation points. In contrast, a second-order mesh of a tetrahedron is further provided with, in addition to the four vertices of the tetrahedron, calculation points positioned on one or more edges and faces of the tetrahedron, to make it possible to perform a more detailed calculation. Further, it is known that the precision level of the analysis may vary depending on such quality of the mesh. Accordingly, the calculating function 155b is able to calculate the reliability A3 on the basis of the quality of the mesh being set.

For example, the memory 152 has stored therein a plurality of levels of quality of the mesh, as settings about the calculation condition. In an example, as illustrated in FIG. 6, the memory 152 has stored therein two settings such as "first order" and "second order". Further, the setting function 155a selects one of the two settings stored in the memory 152 and determines the selected setting as an analysis condition. After that, the calculating function 155b calculates the reliability A3 on the basis of the analysis condition determined by the setting function 155a. For example, when the "first order" is determined as an analysis condition, the calculating function 155b calculates that the "reliability A3=80". Further, the calculating function 155b may increase the score of the reliability A3. For example, when the mesh is varied with respect to a region having complicated movements or a region having a high possibility of the occurrence of a turbulent flow, the calculating function 155b may increase the score by "+10". In other words, the calculating function 155b may be configured to detect the region in which a turbulent flow is likely to occur and to calculate the reliability related to the quality of the mesh on the basis of the detection result. Further, the calculating function 155b may be configured to detect a region having large movements on the basis of medical images in a time series and to calculate the reliability related to the quality of the mesh on the basis of the detection result.

FIG. 7 illustrates an example of a method for calculating the reliability A4 related to temporal resolution. Generally speaking, the fluid analysis for calculating WSS or the like is a four-dimensional analysis in which a time axis is added to the three axes in spatial directions. Further, it is known that the precision level of an analysis is improved by performing the analysis with finer temporal resolution. Accordingly, the calculating function 155b is able to calculate the reliability A4 on the basis of the temporal resolution being set.

When the temporal resolution is gradually made finer, the precision level of the analysis reaches an upper limit at a certain stage. After that, setting the temporal resolution even finer would only increase the calculation amount and would not improve the precision level of the analysis. Consequently, it is desirable to set the temporal resolution appropriately, while taking the balance between the calculation amount and the precision level of the analysis into consideration.

Further, theoretically, it is possible to set the temporal resolution to an arbitrary value without an upper limit. For example, it is possible to set the temporal resolution to be finer than a framerate used at the time of acquiring medical images such as the CT images used in the analysis. In other words, it is possible to perform an analysis so as to interpolate between the frames, by using the medical images in the time series acquired at the certain framerate, as a boundary condition. It should be noted, however, that setting temporal resolution that is excessively finer than the framerate of the medical images would increase the calculation amount but is not expected to improve the precision level of the analysis. Accordingly, it is desirable to set appropriate temporal resolution in accordance with the framerate of the medical images.

For example, the memory 152 has stored therein a plurality of settings of temporal resolution ΔT, as settings about the calculation condition. In one example, as illustrated in FIG. 7, the memory 152 has stored therein three settings such as ">1.0×10−1 sec", "≤1.0×10−1 sec, >1.0×10−4 sec", and "≤1.0×10−4 sec". Further, the setting function 155a selects one of the three settings stored in the memory 152 and determines the selected setting as an analysis condition. After that, the calculating function 155b calculates the reliability A4 on the basis of the analysis condition determined by the setting function 155a. For example, when temporal resolution that is more coarse than "1.0×10−1 sec" is determined as the analysis condition, the calculating function 155b calculates that the "reliability A4=10".

Further, the calculating function 155b may increase the score of the reliability A4. For example, flowrates inside a blood vessel are not constant and vary among different positions and different times. Further, the blood vessel itself may move due to impacts of respiration or pulse, and the moving speed of the blood vessel is not constant either. In addition, to maintain the precision level of the analysis, it is desirable to set the temporal resolution to be finer when the blood flow and the blood vessel have higher speeds. It should be noted, however, that setting the temporal resolution to be finer uniformly would increase the calculation amount of the analysis. To cope with this situation, by making the temporal resolution variable in accordance with the flowrate inside the blood vessel and/or the moving speed of the blood vessel, it is possible to improve the precision level of the analysis while keeping the calculation amount small.

For example, it is possible to use a method by which the blood vessel or the blood flow moving through the blood vessel is monitored by using CT images in a time series, so as to set the temporal resolution to be finer only with respect to the positions and the times at which the monitored speed exceeds a certain level. In the following sections, this method for setting the temporal resolution will be referred to as a method M21.

Further, the profile of the speed of blood flowing through each blood vessel such as a coronary artery is substantially known clinically. For example, it is known that the blood flow speed is the highest at protodiastole among cardiac phases. Accordingly, it is possible to use a method by which information about cardiac phases is obtained by using an electrocardiograph, CT images in a time series, or the like, so as to set the temporal resolution to be finer only with respect to protodiastole. In the following sections, this method for setting the temporal resolution will be referred to as a method M22.

For example, as illustrated in FIG. 7, with regard to setting the temporal resolution, the calculating function 155b may increase the score by "+10" when the method M21 is added and may increase the score by "+1" when the method M22 is added. For example, the memory 152 has stored therein three settings such as the "method M21", the "method M22", and "no additional method", as settings about the calculation condition. Further, the setting function 155a selects one of the three settings stored in the memory 152 and determines the selected setting as an analysis condition. After that, the calculating function 155b calculates the reliability A4 on the basis of the analysis condition determined by the setting function 155a. For example, when the temporal resolution is determined to be more coarse than "1.0×10−1 sec", and the method M21 is added, the calculating function 155b calculates that the "reliability A4=10+10=20".

FIG. 8 illustrates an example of a method for calculating the reliability A5 related to the calculation model. Various types of calculation models that can be used for obtaining WSS through a fluid analysis are known. Generally speaking, it is known that calculation models being more complicated and having a larger calculation amount have a higher precision level of analysis. Accordingly, on the basis of the calculation model being set, the calculating function 155b is able to calculate the reliability A5.

Examples of the calculation models that can be used for obtaining WSS include 0D models. 0D models implement a method by which an analysis is performed while regarding a blood vessel as a circuit on the basis of resistance to the flow of the fluid or the like and may be referred to as equivalent circuit models or lumped models. Further, among 0D models, precision levels of the analyses may vary depending on whether the whole human body is modeled by the circuit or only a target blood vessel is modeled by the circuit. By using a 0D model, it is possible to obtain an analysis result with an excellent level of precision while the calculation amount is relatively small.

Other examples of the calculation models include simulation models based on Fluid Structure Interaction (FSI) schemes. Further, among the FSI schemes, the precision levels of the analyses may vary depending on differences caused by whether Arbitrary-Lagrangian-Eulerian (ALE) method is used or Immersed Boundary (IB) method is used. Besides the 0D models and the FSI schemes, various types of calculation models are known. For example, it is also possible to use a structure-only calculation model or a fluid-only calculation model.

For example, the memory 152 has stored therein a plurality of calculation models as settings about the calculation condition. In one example, as illustrated in FIG. 8, the memory 152 has stored therein six settings such as a "0D model that uses a circuit modeling a whole body", a "0D model that uses a circuit modeling only a target blood vessel", "FSI using ALE", "FSI using IB", "structure-only calculation model", and "fluid-only calculation model". Further, the setting function 155a selects one of the six settings stored in the memory 152 and determines the selected setting as an analysis condition. After that, the calculating function 155b calculates the reliability A5 on the basis of the analysis condition determined by the setting function 155a.

No matter which calculation model is used, an endeavor to improve the precision level of the calculation is, in many situations, carried out by providing a boundary condition. For example, boundary conditions of a fluid analysis can roughly be divided into: conditions F1 of a type that can be measured from an image of the patient; conditions F2 of a type that can be obtained by further performing calculation on the basis of information obtained from an image of the patient; conditions F3 of a type using a value other than images of the patient; conditions F4 that are universal; and conditions F5 of a type that can be obtained with respect to a group to which the patient belongs.

In this situation, the conditions F1 of a type that can be measured from an image of the patient may be, for example, an image measurement value such a blood vessel diameter or a blood flow measurement value such as a flowrate or a flow volume of blood. Further, the conditions F3 of a type using a value other than images of the patient may be, for example, information obtained from a blood test or an interview. Further, the conditions F4 that are universal may be, for example, an average value of a population or the general public. Further, the conditions F5 of a type that can be obtained with respect to a group to which the patient belongs may be, for example, an average value of those who have a clinical case that is the same as or similar to that of the patient.

The conditions F2 of a type that can be obtained by further performing calculation on the basis of information obtained from an image of the patient may be, for example, a parameter obtained on the basis of an image measurement value or a blood flow measurement value. For example, when a blood vessel diameter, a flowrate, a flow volume, or the like has been measured, it is possible to secondarily calculate a parameter such as energy, an amount of transit blood (mass), shear stress, a ventricular change rate, or an Ejection Fraction (EF) value. In the following sections, the parameter obtained on the basis of an image measurement value or a blood flow measurement value may be referred to as a first parameter.

Further, other examples of the conditions F2 include parameters indicating a perfusion area, a perfusion sedimentation, a perfusion speed, a perfusion amount, and a distribution for each blood vessel branch that can be obtained from perfusion (a perfusion calculation). In the following sections, a parameter obtained on the basis of perfusion may be referred to as a second parameter.

In addition, other examples of the conditions F2 include parameters obtained from medical images in a plurality of temporal phases. Examples of such parameters include, for instance, a temporal change, time integration, time derivative, time subtraction, spacetime derivative and integration, average fluctuation, and temporal fluctuation of variance variability. In the following sections, a parameter obtained on the basis of medical images in a plurality of temporal phases may be referred to as a third parameter.

For the calculation of the conditions F2, there are many other methods. For example, it is possible to at first acquire a parameter obtained from an image or a parameter that can be obtained by performing calculation on a parameter obtained from an image, so as to use, as a condition F2, another type of parameter obtained by further multiplying the two parameters by each other. Examples of the other type of parameter include, for instance, a parameter obtained by dividing a transit blood amount at an end point of the analysis system, by a blood vessel cross-section area.

On the basis of any of these boundary conditions, the calculating function 155b may increase the score of the reliability A5. In other words, the memory 152 has stored therein a plurality of types of boundary conditions as settings about the calculation condition. In one example, the memory 152 has stored therein the conditions F1 to F5 as the plurality of settings. In another example, the memory 152 has stored therein the first parameter, the second parameter, and the third parameter as the plurality of settings. Further, the setting function 155a selects at least one of the plurality of settings stored in the memory 152 and determines the selected setting as an analysis condition. After that, the calculating function 155b calculates the reliability A5 on the basis of the analysis condition determined by the setting function 155a. For example, the calculating function 155b calculates the reliability A5, on the basis of a setting determined as an analysis condition from among the plurality of calculation models illustrated in FIG. 8 and another setting determined as another analysis condition from among the first, the second, and the third parameters.

After the reliabilities A1 to A5 have been calculated, the calculating function 155b calculates a reliability of the calculation condition on the basis of the reliabilities A1 to A5. For example, the calculating function 155b calculates each of the reliabilities A1 to A5 as a value in the numerical range of "0 to 100" and further calculates an average of the reliabilities A1 to A5 as the reliability of the calculation condition. Alternatively, the calculating function 155b may calculate a weighted average (a weighted mean) based on the reliabilities A1 to A5, as the reliability of the calculation condition. For example, when the mesh size has a larger impact on the reliabilities than other indices do, the calculating function 155b may use an average value calculated by applying a larger weight to the reliability A1, as the reliability of the calculation condition.

The reliability of the calculation condition may be a single value calculated with respect to the entire blood vessel region or may be values calculated in correspondence with different types of blood vessels. Alternatively, the reliability of the calculation condition may be values calculated in correspondence with different positions (e.g., for each pixel). In other words, the reliability of the calculation condition may be calculated as a spatial distribution of reliabilities.

Next, the reliabilities of the shape based on the reliabilities B1 to B10 will be explained. To begin with, a method for calculating the reliability B1 related to the type of the image will be explained.

In the above description, the CT images acquired by the X-ray CT apparatus 110 were primarily explained; however, it is possible to use any of various types of medical images for obtaining the blood vessel shape. For example, other than from CT images, it is also possible to obtain the blood vessel shape from a medical image such as an MR image, an X-ray angiography image, an IntraVascular UltraSound (IVUS) image, an Optical Coherence Tomography (OCT) image, or an IntraCardiac Echocardiography (ICE) image. Further, it is also possible to obtain the blood vessel shape from an image included in a medical record or from an analysis image such as a perfusion image. More specifically, it is possible to obtain the blood vessel shape by performing a blood vessel segmentation process based on any of these medical images.

In relation to the above, X-ray angiography images are normally two-dimensional images. Thus, the blood vessel shape obtained from an X-ray angiography image is also two-dimensional information. It is, however, also possible to obtain a three-dimensional blood vessel shape, by acquiring a plurality of images having mutually-different imaging angles by moving an X-ray tube and a detector so as to rotate around the patient or by acquiring two images having mutually-different imaging angles while using a bi-plane system.

Further, the blood vessel shape may be obtained without using medical images, in some situations. For example, a general blood vessel shape may be defined in advance on the basis of published reference values or the like, with respect to each of different conditions such as the patient's weight, height, site, or the like. After that, on the basis of patient information or the like obtained from the multi-department system 130, one of the defined blood vessel shapes is selected so as to be used in the analysis.

FIG. 9 illustrates an example of a method for calculating the reliability B1 related to the type of the image. For example, the memory 152 has stored therein a plurality of obtaining methods of the blood vessel shape, as settings about the shape. In an example, as illustrated in FIG. 9, the memory 152 has stored therein seven settings such as "CT", "MRI", "IVUS", "OCT", "X-ray angiography apparatus (2D)", "X-ray angiography apparatus (3D)", and "no image is used". Further, the setting function 155a selects one of the seven settings stored in the memory 152 and determines the selected setting as an analysis condition. After that, the calculating function 155b calculates the reliability B1 on the basis of the analysis condition determined by the setting function 155a. For example, when the blood vessel shape is obtained on the basis of IVUS, the calculating function 155b calculates that the "reliability B1=30".

Further, the calculating function 155b may increase the score of the reliability B1. For example, to perform segmentation on a blood vessel from a medical image, a method is known by which, instead of classifying pixels (pixels or voxels) in the medical image into two elements such as "fluids (e.g., blood)" and "solids (e.g., blood vessels)" that are mutually exclusive, each of the pixels is set with a percentage of "likelihood of being a fluid" and "likelihood of being a solid". In the following sections, this method for obtaining the blood vessel shape will be referred to as a method M31. It is possible to realize the method M31 by, for example, defining each of the pixels with a viscosity coefficient or an elasticity coefficient.

By using the method M31, it is possible to express the state in which a fluid and a solid coexist in one pixel. In other words, because spatial resolution of medical images is finite, there are some situations in which a single pixel happens to contains both a fluid and a solid. By using the method M31, it is possible to express the coexistence state of the fluid and the solid and to thus improve the precision level of the analysis. The method M31 is often used when IB is used as a calculation model.

Further, another method is also known by which the blood vessel shape is obtained by using a plurality of types of medical images. For example, it is possible to obtain a more detailed shape from an IVUS image than from other types of medical images; however, there is a characteristic where it is not possible to obtain shapes other than the shape of a blood vessel in which an IVUS catheter is inserted. For example, when an IVUS catheter is inserted in a coronary artery, it is not possible to obtain shapes other than the shape of the coronary artery from the IVUS image. To cope with this situation, it is possible to use a method by which the overall shape of a blood vessel is obtained on the basis of a CT image or the like, so as to combine therewith the shape obtained from the IVUS image. In the following sections, this method for obtaining the blood vessel shape will be referred to as a method M32. By using the method M32, it is possible to obtain the blood vessel shape in a large range and with a high level of precision, while effectively utilizing the acquired medical images, and it is therefore possible to improve the precision level of the analysis.

Possible methods for combining blood vessel shapes together are not particularly limited; however, for example, it is possible to use a method by which a position alignment is performed, while using a characteristic part rendered in medical images as a reference. Specific examples of the characteristic part include, for instance, plaque or calcification inside the blood vessel and a curved or branching part of the blood vessel. To improve the precision level of the position alignment, it is desirable to use, as the reference, a certain part that is clearly rendered in each of the mutually-different types of medical images. In this situation, it is acceptable to combine blood vessel shapes resulting from segmentation processes performed on the different medical images. Alternatively, it is also acceptable to combine medical images together before performing a segmentation process on the blood vessel shape.

For example, as illustrated in FIG. 9, with regard to the obtaining method of the blood vessel shape, the calculating function 155b increases the score by "+10", when the method M31 is added and increases the score by "+10", when the method M32 is added. For example, the memory 152 has stored therein three settings such as the "method M31", the "method 32", and "no additional method", as settings about the shape. Further, the setting function 155a selects one of the three settings stored in the memory 152 and determines the selected setting as an analysis condition. After that, the calculating function 155b calculates the reliability B1, on the basis of the analysis condition determined by the setting function 155a. For example, when a CT image is used for obtaining the blood vessel shape, and the method M31 is added, the calculating function 155b calculates that the "reliability B1=80+10=90".

FIG. 10 illustrates an example of a method for calculating the reliability B2 related to the image taking condition. FIG. 10 illustrates four examples in which "CT", "MR", "IVUS", and "OCT" are used as medical images. In other words, even among medical images of mutually the same type, the image quality may vary depending on the image taking condition, and the precision level of the shape obtained on the basis of the medical images may also vary. Accordingly, the calculating function 155b is able to calculate the reliability B2, on the basis of the image taking condition being set.

For example, when a CT image is used, examples of the image taking condition related to the calculation of the reliability B2 include "apparatus", "imaging period", "filter", and "reconstruction mathematical function". The "apparatus" denotes, for example, differences among manufacturers or model numbers. As for the "imaging period", generally speaking, the longer the imaging period is, the higher is the image quality. It should be noted, however, that it may be desirable in some situations to complete an imaging process in a short period of time, when the imaged site has movements (e.g., the chest). The "filter" denotes, for example, the type of the filter used for correcting projection data in the situation where a CT image is reconstructed through Filtered Back-Projection (FBP). The "reconstruction mathematical function" denotes, for example, the type of the algorithm to be used in the situation where a CT image is reconstructed through a successive approximate reconstruction (Iterative Reconstruction [IR]).

For example, the memory 152 has stored therein a plurality of image taking conditions used at the time of acquiring the CT image, as settings about the shape. In one example, the memory 152 has stored therein two settings such as an "apparatus Q11" and an "apparatus Q12", so that the setting function 155a selects one of the two settings and determines the selected setting as an analysis condition. Further, the memory 152 has stored therein two settings such as "imaging period: >125 msec" and "imaging period: 125 msec", so that the setting function 155a selects one of the two settings and determines the selected setting as an analysis condition. After that, the calculating function 155b calculates the reliability B2 on the basis of the analysis conditions determined by the setting function 155a. For example, when the "apparatus Q11" and the "imaging period >125 msec" are determined as analysis conditions, the calculating function 155b calculates that the "reliability B2=30+10=40". Further, when a predetermined filter R1 is used as the "filter", the calculating function 155b increases the score by "+5". In addition, when a predetermined mathematical function T1 is used as the "reconstruction mathematical function", the calculating function 155b increases the score by "+1".

FIG. 10 merely illustrates some examples. For instance, when a CT image is used, the larger the dose (the radiation exposure amount) during the imaging is, the better improved is the image quality such as a signal-to-noise (SNR) ratio. Accordingly, the calculating function 155b may perform the calculation in such a manner that the larger the dose is, the higher is the reliability B2. Additionally, the image quality of the CT image varies depending on various types of image taking conditions such as the body thickness of the patient, the imaged site, the imaging method such as a helical scan or a non-helical scan, and the helical pitch. The calculating function 155b may calculate the reliability B2 while taking any of these image taking conditions into consideration.

Further, when an MR image is used, examples of the image taking conditions related to the calculation of the reliability B2 include "apparatus", "imaging period", and "static magnetic field". The "apparatus" denotes, for example, differences among manufacturers or model numbers. As for the "imaging period", generally speaking, the longer the imaging period is, the higher is the image quality. It should be noted, however, that it is desirable to set the imaging period to an appropriate length, because a long imaging period imposes a burden on the patient. The "static magnetic field" denotes the strength of the magnetic field used for the imaging. Generally speaking, the stronger the magnetic field is, the higher is the image quality.

For example, the memory 152 has stored therein a plurality of image taking conditions used at the time of acquiring the MR image, as settings about the shape. In one example, the memory 152 has stored therein two settings such as an "apparatus Q21" and an "apparatus Q22", so that the setting function 155a selects one of the two settings and determines the selected setting as an analysis condition. Further, the memory 152 has stored therein two settings such as "imaging period: >30 min" and "imaging period 30 min" so that the setting function 155a selects one of the two settings and determines the selected setting as an analysis condition. After that, the calculating function 155b calculates the reliability B2 on the basis of the analysis conditions determined by the setting function 155a. For example, when the "apparatus Q21", and the "imaging period >30 min" are determined as analysis conditions, the calculating function 155b calculates that the "reliability B2=30+10=40". Further, when a magnetic field of "8T" or higher is set as the "static magnetic field", the calculating function 155b increases the score by "+1".

Further, when an IVUS image or an OCT image is used, examples of the image taking conditions related to the calculation of the reliability B2 include "apparatus", "retraction speed", and "rotation speed". The "apparatus" denotes, for example, differences among manufacturers or model numbers. The "retraction speed" denotes the speed at which an IVUS catheter or an OCT catheter moves along the centerline of the blood vessel. Generally speaking, the lower the retraction speed is, the higher is the image quality, but the longer is the imaging period.

The "rotation speed" denotes the speed at which an IVUS catheter or an OCT catheter rotates, while using the centerline of the blood vessel as a rotation axis. In this situation, when the rotation speed is excessively high, the image quality may be degraded. In contrast, when the rotation speed is excessively low, because the blood vessel may move due to an impact from the pulse or the like, it may be impossible to correctly capture the blood vessel shape in a specific temporal phase, in some situations. Further, when the rotation speed is low, while the retraction speed is high, the spatial resolution of the image may be degraded. Accordingly, it is desirable to set the rotation speed to an appropriate value, in accordance with the retraction speed. Further, it is also acceptable to keep a predetermined rotation speed in association with each of different values of the retraction speed.

For example, the memory 152 has stored therein a plurality of image taking conditions used at the time of acquiring an IVUS image, as settings about the shape. In one example, the memory 152 has stored therein two settings such as an "apparatus Q31" and an "apparatus Q32" so that the setting function 155a selects one of the two settings and determines the selected setting as an analysis condition. Further, the memory 152 has stored therein two settings such as "retraction speed: <1.5 mm/sec" and "retraction speed: ≥1.5 mm/sec", so that the setting function 155a selects one of the two settings and determines the selected setting as an analysis condition. Further, the memory 152 has stored therein three settings such as "rotation speed: >20 frames/sec", "rotation speed: <20 frames/sec, 10 frames/sec", and "rotation speed: <10 frames/sec", so that the setting function 155a selects one of the three settings and determines the selected setting as an analysis condition. After that, the calculating function 155b calculates the reliability B2, on the basis of the analysis conditions determined by the setting function 155a. For example, when the "apparatus Q31" is determined as an analysis condition, while the retraction speed is lower than "1.5 mmm/sec", and the rotation speed is lower than "10 frames/sec", the calculating function 155b calculates that the "reliability B2=30+10+0=40".

For example, the memory 152 has stored therein a plurality of image taking conditions used at the time of acquiring an OCT image, as settings about the shape. In one example, the memory 152 has stored therein two settings such as an "apparatus Q41" and an "apparatus Q42", so that the setting function 155a selects one of the two settings and determines the selected setting as an analysis condition. Further, the memory 152 has stored therein two settings such as "retraction speed: <20 mm/sec" and "retraction speed: 20 mm/sec", so that the setting function 155a selects one of the two settings and determines the selected setting as an analysis condition. Further, the memory 152 has stored therein three settings such as "rotation speed: >100 frames/sec", "rotation speed: <100 frames/sec, 50 frames/sec", and "rotation speed: <50 frames/sec" so that the setting function 155a selects one of the three settings and determines the selected setting as an analysis condition. After that, the calculating function 155b calculates the reliability B2 on the basis of the analysis conditions determined by the setting function 155a. For example, when the "apparatus Q41" is determined as an analysis condition, while the retraction speed is lower than "20 mm/sec", and the rotation speed is lower than "50 frames/sec", the calculating function 155b calculates that the "reliability B2=30+15+0=45".

Figures 11A, 11B:
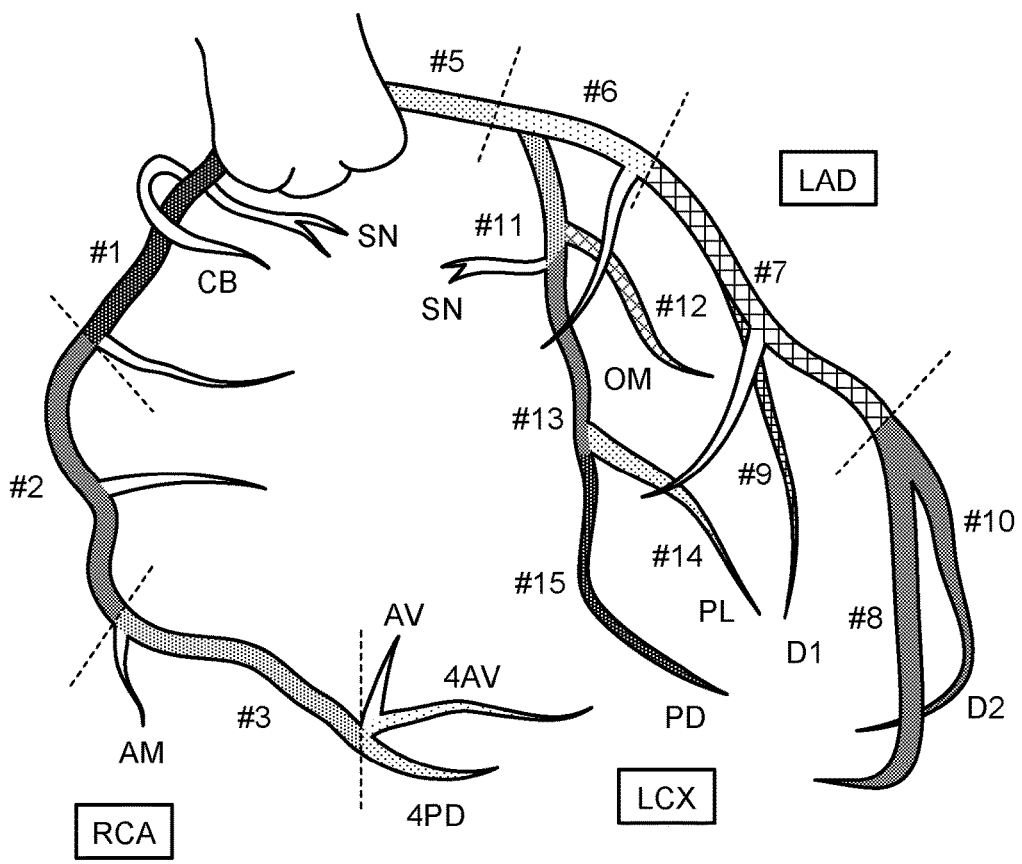
FIG. 11A is a drawing illustrating yet another example of the reliability calculating method according to the first embodiment.
FIG. 11B is a table illustrating yet another example of the reliability calculating method according to the first embodiment.

Next, a method for calculating the reliability B3 related to the type of the blood vessel will be explained. For example, in an example with a coronary artery, as illustrated in FIG. 11A, the blood vessel may be classified according to an AHA classification. Further, the thicknesses and the magnitudes of movements of blood vessels exhibit certain tendencies depending on the types of the blood vessels. Accordingly, blood vessels from which the blood vessel shapes can easily be obtained and blood vessels from which the blood vessel shapes are difficult to obtain are generally known. Consequently, the calculating function 155b is able to calculate the reliability B3 on the basis of the type of the blood vessel being set.

Further, although the entirety of a coronary artery may be subject to an analysis in some situations, a part of a blood vessel may be selected so as to perform an analysis thereon, in many situations. For example, as with "#5 Left Main Trunk (LMT)" illustrated in FIG. 11A, an analysis may be performed in some situations by selecting only a certain blood vessel in which a serious symptom may be exhibited upon the occurrence of stenosis. Further, for example, an analysis may be performed in some situations, by selecting only a certain blood vessel recognized as having calcification or plaque on the basis of a medical image. Further, an analysis may be performed in some situations, while excluding a certain blood vessel expected to have large movements on the basis of past findings, for example.

FIG. 11B illustrates an example of a method for calculating the reliability B3 related to the type of the blood vessel. For example, the memory 152 has stored therein a plurality of types of blood vessels, as settings about the shape. In one example, as illustrated in FIG. 11B, the memory 152 has stored therein a plurality of settings such as "#1", "#2", "#3", "#4", "#5", "#6", "#7", "#8", "#9", "#10", "#11", "#12", "#13", "#14", and "#15". Further, the setting function 155a selects at least one of the plurality of settings stored in the memory 152 and determines the selected setting as an analysis condition. After that, the calculating function 155b calculates the reliability B3, on the basis of the analysis condition determined by the setting function 155a.

In this situation, when a plurality of types of blood vessels are determined as analysis conditions, the calculating function 155b may individually calculate a reliability with respect to each of the different types of blood vessels or may calculate a single reliability. For example, when "#1" and "#2" are determined as analysis conditions, the calculating function 155b may calculate a reliability B3 with respect to "#1" and a reliability B3 with respect to "#2". Alternatively, when "#1" and "#2" are determined as analysis conditions, the calculating function 155b may calculate only a reliability B3 with respect to "#1 and #2". For instance, in the example of FIG. 11B, the calculating function 155b calculates the "reliability B3" with respect to "#1 and #2" as "reliability B3=(10+20)/2=15".

Next, a method for calculating the reliability B4 related to the blood vessel shape will be explained. Generally speaking, the narrower a blood vessel is, the more difficult it is to obtain the shape of the blood vessel. For example, when the shape of a coronal artery is to be obtained on the basis of a CT image, the smaller the blood vessel diameter is relative to the spatial resolution of the CT image, the lower is the precision level of the blood vessel shape to be obtained. In particular, when the thickness of the blood vessel is approximately equal to the spatial resolution of the CT image, it is difficult to obtain the blood vessel shape. Accordingly, the calculating function 155b is able to calculate the reliability B4 on the basis of the blood vessel shape being set.

For example, the memory 152 has stored therein a plurality of parameters indicating the blood vessel shape, as settings about the shape. In one example, as illustrated in FIG. 12, the memory 152 has stored therein four settings such as "blood vessel shape: >30 [mm]", "blood vessel shape: ≤30 [mm], >10 [mm]", "blood vessel shape: ≤10 [mm], >2.5 [mm]", and "blood vessel shape: ≤2.5 [mm]". In other words, the memory 152 has stored therein the classification of the thicknesses of blood vessels, as settings about the shape. Further, the setting function 155a selects one of the plurality of settings stored in the memory 152 and determines the selected setting as an analysis condition. After that, the calculating function 155b calculates the reliability B4 on the basis of the analysis condition determined by the setting function 155a.

Further, because the thickness of a blood vessel varies depending on positions, the calculating function 155b may calculate a reliability B4 with respect to each of different positions in the blood vessel or may calculate a single reliability B4 with respect to the entire blood vessel, on the basis of an average value of the thicknesses of the blood vessel in the different positions, or the like. Further, the calculating function 155b may calculate a reliability B4 with respect to each type of blood vessel. Also, when the blood vessel shape is complicated with many branches and/or curves, the precision level of the blood vessel shape obtained on the basis of a CT image or the like may be degraded. For this reason, the calculating function 155b may calculate a reliability B4, while taking into consideration the number of branching parts, the curvature of the blood vessel, or the like, in addition to the thickness of the blood vessel.

Next, a method for calculating the reliability B5 related to an intravascular structure will be explained. Examples of the intravascular structure include non-artificial objects such as calcification or plaque in the blood vessel and artificial objects such as a stent placed in the blood vessel. When an intravascular structure is present in the blood vessel, it is known that the precision level of the obtained shape may be degraded. In other words, because the shape inside the blood vessel is complicated by the presence of the intravascular structure, it is difficult to obtain the accurate shape. Further, at the time of obtaining the blood vessel shape on the basis of a CT image, when an intravascular structure is included in the imaged range, the precision level of the obtained shape may be degraded by the occurrence of a metal artifact, in some situations.

For example, the memory 152 has stored therein a plurality of states regarding the presence/absence and types of intravascular structures, as settings about the shape. In one example, as illustrated in FIG. 13, the memory 152 has stored therein four settings such as "none", "calcification", "plaque", and "artificial object". Further, the setting function 155a selects one of the four settings stored in the memory 152 and determines the selected setting as an analysis condition. After that, the calculating function 155b calculates the reliability B5 on the basis of the analysis condition determined by the setting function 155a.

When an intravascular structure such as plaque is present, known methods include a method by which the blood vessel shape is obtained while ignoring the presence of the intravascular structure and a method by which the shape of the intravascular structure is also detected. Further, when the shape of the intravascular structure is detected, although the calculation amount is increased by the need to execute an algorithm for the detection, the precision level of the analysis is improved. In the following sections, the method by which the shape of the intravascular structure is detected will be referred to as a method M41. When the method M41 is added, the calculating function 155b may increase the score by "+10", as illustrated in FIG. 13, for example.

Further, the calculating function 155b may calculate a reliability B5 with respect to each of different positions. For example, the calculating function 155b may calculate a reliability B5 with respect to the vicinity of the intravascular structure and another reliability B5 with respect to another region. Further, for example, the calculating function 155b may calculate the intravascular structure with respect to each of the pixels. In other words, the calculating function 155b may be configured to detect the position and the type of the intravascular structure and to calculate, with respect to each of different positions, a reliability related to the intravascular structure in accordance with the type of the intravascular structure.

FIG. 14 illustrates a method for calculating the reliability B6 related to an interim calculation result. When an index value such as WSS is to be calculated on the basis of CFD, generally speaking, the calculation is repeatedly performed before a final result is obtained. In this situation, even when the final result has a reasonable value, the analysis result may not necessarily be appropriate. In other words, there is a possibility that the reasonable value may have been calculated by accident, instead of the reasonable value having been calculated as a result of an appropriate analysis.

During an appropriate analysis, an initial value is gradually adjusted through the repeated calculation, until the value converges into a final result. Accordingly, the calculating function 155b is able to calculate the reliability B6, by evaluating the interim calculation result.

For example, it is possible to evaluate the interim calculation result, by comparing various types of parameters related to CFD with published reference values. For example, at first, with respect to blood vessel pressure, blood vessel firmness, a blood flowrate, movements of the blood vessel, and the like, of blood vessel #8 illustrated in FIG. 11A, average values of published reference values are obtained. Subsequently, among interim calculation results, for a calculation result having the largest difference from the average value of the published reference values, a percentage against the average value of the published reference values is calculated. After that, when the calculated percentage is close to "100%", it is evaluated that an appropriate analysis was performed.

For example, the memory 152 has stored therein a plurality of percentage values of an interim calculation result against the average value of the published reference values, as settings about the shape. In one example, as illustrated in FIG. 14, the memory 152 has stored therein five settings such as "more than 500% of the average value of the published reference values", "150% to 500% of the average value of the published reference values", "75% to 150% of the average value of the published reference values", "20% to 75% of the average value of the published reference values", and "less than 20% of the average value of the published reference values". Further, the setting function 155a selects one of the five settings stored in the memory 152 and determines the selected setting as an analysis condition. For example, after the analysis for calculating WSS is performed, the setting function 155a obtains an interim calculation result of the analysis, determines which one of the five settings corresponds to the interim calculation result, and determines the judgment result as an analysis condition. After that, the calculating function 155b calculates the reliability B6 on the basis of the analysis condition determined by the setting function 155a.

In the example illustrated in FIG. 14, the calculating function 155b may calculate one reliability B6 each with respect to the blood vessel pressure, the blood vessel firmness, the blood flowrate, and movements of the blood vessel or may calculate a single reliability B6. For example, the setting function 155a may determine an analysis condition by identifying a parameter having the largest difference from the average value of the published reference values, from among the blood vessel pressure, the blood vessel firmness, the blood flowrate, and the movements of the blood vessel, so that the calculating function 155b calculates the reliability B6 only with respect to the identified parameter.

FIG. 15 illustrates an example of a method for calculating the reliability B7 related to the shape obtaining method. Blood vessel shapes are obtained, in many situations, by segmenting a blood vessel from a medical image. In this regard, the precision level of the obtained blood vessel shape may vary depending on the segmentation method being used. Accordingly, the calculating function 155b is able to calculate the reliability B7 on the basis of the segmentation method being set.

Examples of the segmentation method include a pixel-wise method and a model-based method. The pixel-wise method is a method by which, with respect to each of the pixels or voxels in an image, the pixel (or the voxel) is classified as being a blood vessel or not. The model-based method is a method by which a three-dimensional (3D) model indicating a schematic shape of a blood vessel is prepared in advance so as to obtain a 3D shape of the blood vessel by deforming the 3D model so as to fit a medical image acquired from the patient.

For example, the memory 152 has stored therein a plurality of segmentation methods, as settings about the shape. In one example, as illustrated in FIG. 15, the memory 152 has stored therein two settings such as "Pixel-wise" and "model-based". Further, the setting function 155a selects one of the two settings stored in the memory 152 and determines the selected setting as an analysis condition. After that, the calculating function 155b calculates the reliability B7 on the basis of the analysis condition determined by the setting function 155a.

FIG. 16 illustrates an example of a method for calculating the reliability B8 related to the phase. When the shape of a blood vessel impacted by periodical movements such as respiration or pulse is to be obtained, the precision level of the obtained blood vessel shape may vary depending on which phase of the respiration or the pulse is rendered in the medical image being used. For example, when the shape of a coronary artery is to be obtained, because there are fewer movements in diastole than in systole of the heart, it is possible to obtain a more accurate blood vessel shape by using an image from diastole. Accordingly, the calculating function 155b is able to calculate the reliability B8 on the basis of the phase at the time of acquiring the medical image used for obtaining the blood vessel shape.

Further, depending on the type of the medical image, the extent of the impact imposed by the movements such as the respiration or the pulse may vary. More specifically, the shorter the imaging period is, the smaller is the impact of the movements. Further, when it is possible to make a correction through electrocardiographic synchronization or the like, the impact of the movements may be alleviated. Accordingly, the calculating function 155b may calculate a reliability B8 by further taking the type of the medical image into consideration.

For example, the memory 152 has stored therein a plurality of phases of periodical movements such as the respiration or the pulse, as settings about the shape. In one example, as illustrated in FIG. 16, the memory 152 has stored therein four settings such as "diastole (CT)", "systole (CT)", "diastole (IVUS)", and "systole (IVUS)". Further, the setting function 155a selects one of the four settings stored in the memory 152 and determines the selected setting as an analysis condition. After that, the calculating function 155b calculates the reliability B8 on the basis of the analysis condition determined by the setting function 155a.

Further, depending on the position of the blood vessel, the extent of the impact imposed by the movements such as the respiration or the pulse may vary. Accordingly, the calculating function 155b may calculate a reliability B8 while taking the position of the blood vessel into consideration. For example, when obtaining the shape of a coronary artery, the calculating function 155b may classify the blood vessel as illustrated in FIG. 11A, so as to calculate the reliability B8 in accordance with the classification.

FIG. 17 illustrates an example of a method for calculating the reliability B9 related to the magnitude of movements. The precision level of the obtained blood vessel shape may vary depending on impacts imposed by periodical movements such as the respiration or the pulse or by body movements of the patient during the imaging process. Accordingly, the calculating function 155b is able to calculate the reliability B9 on the basis of the magnitude of the movements at the time of acquiring the medical image used for obtaining the blood vessel shape. In this situation, the method for obtaining the magnitude of the movements is not particularly limited. For example, it is possible to obtain the magnitude of the movements, by taking images over the course of time so as to acquire a plurality of frames of medical images and further making a comparison between the frames. Further, it is also acceptable to set the magnitude of the movements in advance, with respect to each type of blood vessel or each phase.

For example, the memory 152 has stored therein a plurality of settings about the magnitude of the movements of the blood vessel, as settings about the shape. In one example, as illustrated in FIG. 17, the memory 152 has stored therein three settings such as "<X1", "≥X1, <X2", and "≥X2". In this situation, X1 and X2 are each a predetermined threshold value for the magnitude of the movements. Further, the setting function 155a selects one of the three settings stored in the memory 152 and determines the selected setting as an analysis condition. After that, the calculating function 155b calculates the reliability B9 on the basis of the analysis condition determined by the setting function 155a. In this situation, the calculating function 155b may calculate a reliability B9 with respect to each of different positions. For example, the calculating function 155b may be configured to identify a region corresponding to "<X1", a region corresponding to "≥X1, <X2", and a region corresponding to "≥X2", so as to calculate a reliability B9 with respect to each of the regions.

FIG. 18 illustrates an example of a method for calculating the reliability B10 related to artifacts. For example, when a blood vessel shape is to be obtained on the basis of a medical image, the medical image may have artifacts. For example, when there are body movements of the patient during the imaging process, motion artifacts may occur in the medical image. As another example, artifacts may occur in a CT image due to a malfunction of some of the detecting elements in a detector or a malfunction in the X-ray output at a specific radiation angle during an imaging process of the CT image. Further, because of the occurrence of such artifacts, the precision level of the obtained blood vessel shape may be degraded, in some situations.

For example, the memory 152 has stored therein a plurality of states regarding the presence/absence and types of artifacts, as settings about the shape. In one example, as illustrated in FIG. 18, the memory 152 has stored therein two settings such as "No artifacts" and "Some artifacts". Further, the setting function 155a selects one of the two settings stored in the memory 152 and determines the selected setting as an analysis condition. After that, the calculating function 155b calculates the reliability B10 on the basis of the analysis condition determined by the setting function 155a. Although the example was explained in which the reliability is assigned according to the presence/absence and the type of the artifacts, possible embodiments are not limited to this example. It is also acceptable to further calculate the size of a region containing the artifacts, so as to calculate a reliability in such a manner that the larger the size of the region is, the lower is the reliability. For example, the calculating function 155b may be configured to detect one or both of the type of the artifacts and the amount of artifacts and to calculate the reliability B10 related to the artifacts on the basis of the detection result. For example, when one of the detectors fails to detect a signal in a specific view during the imaging process of a CT image, streak artifacts in stripes may appear in the CT image. In that situation, the calculating function 155b may calculate the volume of the streak artifact part occurring inside a region corresponding to a created blood vessel shape mesh so as to calculate the reliability B10 in such a manner that the larger the volume of the artifact part is relative to the blood vessel shape mesh, the lower is the reliability. When a reliability is to be calculated with respect to each of different locations of the blood vessel shape mesh, the volume of a streak artifact part is calculated within a segmented part of the blood vessel shape mesh for which the reliability is to be calculated, instead of the volume of the streak artifact part relative to the entire blood vessel shape mesh.

Further, various types of methods for correcting artifacts are known. For example, with respect to each type of artifacts, it is possible to perform an image processing process using a filter or a noise removal process using a machine learning scheme. When it is possible to remove or reduce artifacts by performing the correction, the precision level of the blood vessel shape is expected to improve. In the following sections, the artifact correcting process will be referred to as a method M51. When the method M51 is added, the calculating function 155b may increase the score of the reliability B10 by "+10" as illustrated in FIG. 18, for example. Furthermore, although various types of correcting methods are known as artifact correcting methods, the extent of the removal or the reduction using an image processing process may vary depending on the type of the artifacts. For example, artifacts originating from the apparatus (e.g., the streak artifacts described above and ring artifacts that may be caused when a specific detector fails to output a detection signal in all the views) occur in a CT image with a geometric pattern. It is therefore possible to accurately correct those artifacts through an image processing process. In contrast, as for motion artifacts caused by an unexpected movement such as a movement of the patient in an unanticipated direction, a spasm, or an arrhythmia during the imaging process, although it is possible to estimate a position that would have been assumed if "there had not been the movement", the estimated position is not necessarily a true value. For this reason, even when a correction is made, the accuracy of the correction is not perfect. Accordingly, it is also acceptable to change the range of the increase in the score, depending on the type of the artifacts to be corrected.

Similarly to the example of the reliabilities of the calculation condition, the calculating function 155b calculates one or more reliabilities of the shape, on the basis of the reliabilities B1 to B10. The reliability of the shape may be a single value calculated with respect to the entire blood vessel region, may be values calculated in correspondence with different types of blood vessels, or may be values calculated in correspondence with different positions (e.g., for each pixel).

Next, the reliability of the characteristics based on the reliabilities C1 to C4 will be explained. In this situation, the characteristics denote, for example, physical properties or states of the blood vessel and peripheral tissues thereof. To begin with, a method for calculating the reliability C1 related to the type of the image will be explained.

It is possible to obtain the characteristics of the blood vessel from a medical image such as, for example, a CT image, an MR image, an X-ray angiography image, an IVUS image, an OCT image, or an ICE image. Further, it is also possible to obtain the characteristics from information included in a medical record or from an analysis image such as a perfusion image.

For example, it is possible to obtain a distribution of calcification or plaque inside the blood vessel, on the basis of brightness values of a CT image and to assign predetermined characteristics to the distribution. In one example, it is possible to assign a predetermined firmness level based on published reference values, to positions corresponding to calcification or plaque. Further, when a photon counting imaging process or a dual-energy imaging process has been performed, it is possible to obtain a distribution of components through a substance discrimination process so as to estimate the characteristic in each of different positions.

Further, it is also possible to evaluate components of the calcification or the plaque so as to assign characteristics corresponding to the components. For example, when an IVUS image or an OCT image is used, it is possible to identify a fat-rich region in the plaque and to assign characteristics corresponding to fat amounts. Further, when an IVUS image or an OCT image is used, it is also possible to evaluate anisotropy of tissues. Furthermore, it is also possible to evaluate volume compressibility, viscosity, a coefficient of friction, inflammation, surface roughness, and the like.

When an MR image is used, it is possible to measure a scar region. For example, in myocardia, it is known that scar regions are not so easily deformed as other normal tissues. Consequently, by identifying the scar region on the basis of the MR image, it is possible to obtain characteristics.

There may be some situations where it is impossible to obtain characteristics on the basis of medical images. In those situations, it is possible to use published reference values as the characteristics or to estimate characteristics on the basis of a statistical model implementing a Gaussian estimation method or the like.

FIG. 19 illustrates an example of a method for calculating the reliability C1 related to the type of the image. For example, the memory 152 has stored therein a plurality of methods for obtaining the characteristics, as settings about the characteristics. In one example, as illustrated in FIG. 19, the memory 152 has stored therein eight settings such as "CT", "Photon counting CT (PCCT)", "MRI", "IVUS", "OCT", "X-ray angiography apparatus", "published reference values", and "Gaussian estimation method". Further, the setting function 155a selects one of the eight settings stored in the memory 152 and determines the selected setting as an analysis condition. After that, the calculating function 155b calculates the reliability C1 on the basis of the analysis condition determined by the setting function 155a.

There may be some situations where, although no medical image of the target patient has been acquired, a medical image of another patient who has a similar clinical case may be utilized. In those situations, it is possible to conveniently use characteristics based on the medical image of the other patient. However, because the information is derived from the other patient, when conveniently using the characteristics based on the medical image of the other patient, the calculating function 155b may decrease the score of the reliability C1, compared to the situation where characteristics are obtained on the basis of a medical image of the target patient.

Further, it is also possible to use a method by which characteristics are obtained by using a plurality of medical images. For example, when an imaging process is performed by inserting an IVUS catheter in a blood vessel LAD, it is possible to obtain characteristics of the LAD on the basis of the IVUS image and to obtain characteristics of other blood vessels on the basis of a CT image. Further, for example, when CT images in a time series have been taken, it is possible to identify a CT image having the smallest movement with respect to each region, so as to obtain characteristics of each region from the corresponding CT image. In one example, it is possible to obtain characteristics of blood vessel #8 in FIG. 11A from a CT image corresponding to the cardiac phase 77% and to obtain characteristics of the other blood vessels from a CT image corresponding to the cardiac phase 99%. When this method is added, the calculating function 155b may increase the score of the reliability C1.

FIG. 20 illustrates an example of a method for calculating the reliability C2 related to the image taking condition. FIG. 20 illustrates four examples in which "CT", "MR", "IVUS", and "OCT" are used as medical images. In other words, even among medical images of mutually the same type, the image quality may vary depending on the image taking condition, and the precision level of the characteristics obtained on the basis of the medical images may also vary. Accordingly, the calculating function 155b is able to calculate the reliability C2, on the basis of the image taking condition being set.

For example, when a CT image or an MR image is used, examples of the image taking conditions related to the calculation of the reliability C2 include "apparatus" and "imaging period". Further, it is also acceptable to increase the score when a predetermined filter R1 is used as the "filter" or when a magnetic field of "8T" or higher is set as the "static magnetic field". Further, when a photon counting imaging process or a dual-energy imaging process is performed, it is possible to obtain additional information related to the characteristics, compared to the situations using a normal CT image. Accordingly, it is acceptable to increase the score when a "PCCT" is used as the detector, for example.

Further, when an IVUS image or an OCT image is used, examples of the image taking conditions related to the calculation of the reliability C2 include "apparatus", "retraction speed", and "rotation speed". Further, when an IVUS image or an OCT image is used, it is possible to obtain detailed information about characteristics inside the blood vessel, compared to the situations using a normal CT image. In consideration of the difference caused by the type of the image, it is also acceptable to make an adjustment so as to calculate the reliability C2 to be higher when an IVUS image or an OCT image is used, for example.

FIG. 21 illustrates an example of a method for calculating the reliability C3 related to the type of the blood vessel. For example, the memory 152 has stored therein a plurality of types of blood vessels as settings about the characteristics. Further, the setting function 155a selects one of the plurality of settings stored in the memory 152 and determines the selected setting as an analysis condition. After that, the calculating function 155b calculates the reliability C3 on the basis of the analysis condition determined by the setting function 155a.

FIG. 22 illustrates an example of a method for calculating the reliability C4 related to the phase. For example, the memory 152 has stored therein a plurality of phases of periodical movements such as respiration or pulse, as settings about the characteristics. Further, the setting function 155a selects one of the plurality of settings stored in the memory 152 and determines the selected setting as an analysis condition. After that, the calculating function 155b calculates the reliability C4 on the basis of the analysis condition determined by the setting function 155a.

Obtaining characteristics with respect to each of different positions in a blood vessel is based on the premise that the shape of the blood vessel has been obtained. Accordingly, for those blood vessels of which the blood vessel shapes are difficult to obtain, it is even more difficult to obtain the characteristics, in many situations. In consideration of these differences, when calculating the reliability C3 or the reliability C4, it is also acceptable to exaggerate the changes caused by the type of the blood vessel or the phase, compared to the situation illustrated in FIG. 11B or FIG. 16, for example.

Similarly to the reliabilities related to the calculation condition and the reliabilities related to the shape, the calculating function 155b calculates one or more reliabilities related to the characteristics on the basis of the reliabilities C1 to C4. The reliability of the characteristics may be a single value calculated with respect to the entire blood vessel region, may be values calculated in correspondence with different types of blood vessels, or may be values calculated in correspondence with different positions (e.g., for each pixel).

Next, the reliability of the fluid based on the reliabilities D1 to D4 will be explained. The fluid is represented by, for example, fluid information such as a flowrate or pressure of the blood in the blood vessel. When it is possible to use fluid information for CFD, it is possible to perform an analysis with a higher level of precision, by using the fluid information as a fluid condition (a boundary condition) for the boundary of calculation regions. Other examples of the fluid information include viscosity of the blood, a Reynolds number, a hematocrit value, FFR, WSS, a blood sugar value, and temperature.

For example, it is possible to obtain the fluid information from a medical image such as an IVUS image, an OCT image, an MR image, a PET image, a SPECT image, an ICE image, an X-ray angiography image, a CT image using dual energy of a photon counting detector, or an ultrasound doppler image. Further, it is also possible to obtain the fluid information from an image included in a medical record or from an analysis image such as a perfusion image. Furthermore, it is also possible to obtain the fluid information from a blood test performed on the patient.

Alternatively, it is also possible to use a published reference value as the fluid information or to estimate fluid information on the basis of a statistical model implementing a Gaussian estimation method or the like. In other examples, it is also possible to conveniently use fluid information obtained from another patient who has a similar clinical case or to set a random value. Further, it is also possible to re-adjust the fluid information on the basis of an analysis result, so as to repeatedly perform the process until a reasonable analysis result is obtained.

FIG. 23 illustrates an example of a method for calculating the reliability D1 related to the type of the image. For example, the memory 152 has stored therein a plurality of methods for obtaining the fluid as settings about the fluid. In one example, as illustrated in FIG. 23, the memory 152 has stored therein eight settings such as "Photon counting CT (PCCT)", "MRI", "IVUS", "OCT", "X-ray angiography apparatus", "published reference values", "Gaussian estimation method", and "blood test". Further, the setting function 155a selects one of the eight settings stored in the memory 152 and determines the selected setting as an analysis condition. After that, the calculating function 155b calculates the reliability D1 on the basis of the analysis condition determined by the setting function 155a.

FIG. 24 illustrates an example of a method for calculating the reliability D2 related to the image taking condition. FIG. 24 illustrates three examples in which "MR", "IVUS", and "OCT" are used as medical images. In other words, even among medical images of mutually the same type, the image quality may vary depending on the image taking condition, and the precision level of the fluid obtained on the basis of the medical images may also vary. Accordingly, the calculating function 155b is able to calculate the reliability D2, on the basis of the image taking condition being set.

As for information about the blood itself such as viscosity, one of the most direct methods is to obtain the information from a blood test. In contrast, FIG. 24 illustrates an evaluation based on the premise where the fluid information is obtained on the basis of an image, the reliability D2 may be calculated to be lower. Alternatively, it is also acceptable to provide a column indicating a test condition of the blood test so that, when the blood test is performed, the reliability D2 is calculated in accordance with the test condition.

FIG. 25 illustrates an example of a method for calculating the reliability C4 related to the type of the blood vessel. For example, the memory 152 has stored therein a plurality of types of blood vessels, as settings about the fluid. Further, the setting function 155a selects one of the plurality of settings stored in the memory 152 and determines the selected setting as an analysis condition. After that, the calculating function 155b calculates the reliability D3 on the basis of the analysis condition determined by the setting function 155a.

FIG. 26 illustrates an example of a method for calculating the reliability D4 related to the phase. For example, the memory 152 has stored therein a plurality of phases of periodical movements such as respiration or pulse, as settings about the characteristics. Further, the setting function 155a selects one of the plurality of settings stored in the memory 152 and determines the selected setting as an analysis condition. After that, the calculating function 155b calculates the reliability D4 on the basis of the analysis condition determined by the setting function 155a.

Similarly to the reliabilities of the calculation condition, the reliabilities of the shape, and the reliabilities of the characteristics, the calculating function 155b calculates one or more reliabilities of the characteristics on the basis of the reliabilities D1 to D4. The reliability of the fluid may be a single value calculated with respect to the entire blood vessel region, may be values calculated in correspondence with different types of blood vessels, or may be values calculated in correspondence with different positions (e.g., for each pixel).

As explained above, the memory 152 is configured to store therein the plurality of settings each with respect to the calculation condition, the shape, the characteristics, and the fluid. Further, the setting function 155a is configured to select one of the plurality of settings stored in the memory 152 and to determine the selected settings as the analysis conditions. Further, under the analysis conditions determined by the setting function 155a, the calculating function 155b is configured to calculate the WSS. Furthermore, the calculating function 155b is configured to calculate the reliability of the calculation condition, the reliability of the shape, the reliability of the characteristics, and the reliability of the fluid and to calculate, on the basis of the various types of reliabilities, one or more reliabilities of the WSS calculated under the analysis conditions determined by the setting function 155a.

For example, the calculating function 155b may calculate the reliability of the calculation condition, the reliability of the shape, the reliability of the characteristics, and the reliability of the fluid each within a numerical range of "0 to 100" and may further calculate an average of the various types of reliabilities as the reliability of the WSS. Further, the calculating function 155b may calculate a weighted average (a weighted mean) as the reliability of the WSS. For example, when the impact imposed by the reliability of the calculation condition is larger than impacts of the others, the calculating function 155b may determine an average value calculated by applying a larger weight to the reliability of the calculation condition, to be the reliability of the WSS. The reliability of the WSS may be a single value calculated with respect to the entire blood vessel region, may be values calculated in correspondence with different types of blood vessels, or may be values calculated in correspondence with different positions (e.g., for each pixel).

The one or more reliabilities calculated by the calculating function 155b are output by the output function 155c so as to be presented to the user. For example, the output function 155c is configured to display the WSS and to also cause the reliability thereof to be displayed while being kept in correspondence with the WSS. For example, the output function 155c may cause a display image to be displayed in which a WSS value is assigned to each of different positions in a three-dimensional image and may also cause a numerical value indicating the reliability to be displayed. In another example, the output function 155c may cause a display image to be displayed in which a WSS value is assigned to each of different positions in a three-dimensional image and may also cause another display image to be displayed in which a reliability value is assigned to each of different positions in the three-dimensional image. Alternatively, the output function 155c may transmit the one or more reliabilities calculated by the calculating function 155b to an external device such as the medical information display apparatus 140. In that situation, the external device is configured to display the one or more reliabilities so as to be presented to the user.

The user who is presented with the WSS and the one or more reliabilities is able to perform a diagnosing process and to make a treatment plan, while referencing the presented information. For example, by using the WSS, it is possible to judge whether a coronary artery disease will worsen in a non-invasive manner and to also judge whether or not treatment such as Percutaneous Coronary Intervention (PCI) is necessary.

However, because it is impossible to directly visualize the state inside the blood vessel, the user would normally be unable to determine how reliable a WSS value serving as an analysis result is. Further, although the information used in analyses can be acquired from medical images, the medical images themselves also have errors caused by a limitation of the resolution or artifacts. Further, it is not always possible to acquire all the information required in an analysis, and certain analyses need to be performed on the basis of published reference values or a hypothesis, in some situations. In addition, the precision level of an analysis may fluctuate depending on various circumstances. Further, even when a WSS value is presented, it would be difficult to use the WSS value as a basis of judgment, if the reliability thereof were unclear.

In contrast, by using the medical information processing apparatus 150 according to the first embodiment, the user is able to refer to the reliability together with the WSS. For example, when the WSS value indicates that the coronary artery disease of a patient will worsen, and the reliability thereof is high, the user is able to determine that treatment such as PCI is necessary. On the contrary, when the reliability is low, the user is able to determine, for example, that an additional image acquisition or a blood test is necessary, in order to make an appropriate judgment based on a WSS value having a higher reliability. As explained herein, by calculating and presenting the reliability for the user, the medical information processing apparatus 150 is able to make the WSS value easier to use for the user.

Although the example was explained in which the plurality of settings are stored each with respect to the calculation condition, the shape, the characteristics, and the fluid, the memory 152 may store therein only one setting with respect to one or more selected from among the calculation condition, the shape, the characteristics, and the fluid. For example, calculation conditions such as the mesh size, the mesh shape, the mesh quality, the temporal resolution, and the calculation model may each have a fixed value. In other words, the memory 152 may store therein only one setting about each of the calculation conditions. In that situation, the setting function 155a is able to read the setting stored in the memory 152 and to determine the read setting as an analysis condition. The same applies to the settings about the shape, the characteristics, and the fluid.

Further, although the example was explained in which the reliability of the calculation condition is calculated on the basis of the reliabilities A1 to A5, the calculating function 155b may calculate a reliability of the calculation condition by omitting the use of one or more of the reliabilities A1 to A5, as appropriate. In other words, the calculating function 155b is configured to calculate the reliability of the calculation condition on the basis of at least one of the reliabilities A1 to A5. The same applies to the reliability of the shape, the reliability of the characteristics, and the reliability of the fluid.

Further, although the example was explained in which the reliability (the total reliability) of the WSS is calculated on the basis of the reliability of the calculation condition, the reliability of the shape, the reliability of the characteristics, and the reliability of the fluid, the calculating function 155b may calculate the reliability of the WSS by omitting, as appropriate, the use of one or more selected from among: the reliability of the calculation condition, the reliability of the shape, the reliability of the characteristics, and the reliability of the fluid. In other words, the calculating function 155b is configured to calculate the reliability of the WSS on the basis of at least one of the reliability of the calculation condition, the reliability of the shape, the reliability of the characteristics, and the reliability of the fluid.

Further, although the example was explained in which the reliability of the WSS is calculated on the basis of the reliability of the calculation condition, the reliability of the shape, the reliability of the characteristics, and the reliability of the fluid, the calculating function 155b may calculate the reliability of the WSS further using other data.

For example, the memory 152 further stores therein patient information. The patient information is various types of information, e.g., age, height, weight, region and race. Such the patient information may be obtained from the multi-department system 130. The calculating function 155b selects at least one of settings of a calculation condition, a shape, a characteristic, and a fluid, to determine the analysis condition. The calculating function 155b calculates the reliability based on the analysis condition and the patient information.

As described above, reference values may be used for calculating the reliability. For example, as illustrated in FIG. 23, reference values may be used as the fluid information when the blood test and the image acquisition are not conducted. However, reliability of reference values is not constant and changes according to patient. Specifically, population to which the patient belongs is large, the reliability of reference values also increases. For example, morbidity of sickness such as cerebral infarction increases with age. For this reason, rate the blood test and the image acquisition are conducted also increases with age. Therefore, the reliability of reference values increases with age of patient.

The calculating function 155b may amend the reliability of the WSS based on the patient information. For example, the calculating function 155b calculates the reliability of the WSS on the basis of the reliability of the calculation condition, the reliability of the shape, the reliability of the characteristics, and the reliability of the fluid as described above. And the calculating function 155b amends the calculated reliability of WSS based on the patient information. For example, the calculating function 155b increases or decreases the calculated reliability of WSS, or multiply a coefficient to the calculated reliability of WSS, according to age of the patient.

In the first embodiment described above, the example was explained in which, as illustrated in FIG. 2, both the WSS and the reliability are calculated and displayed. In contrast, as a second embodiment, an example will be explained in which a reliability is calculated at first so that WSS is calculated on the basis of the reliability. In the second embodiment, it is also acceptable to display only the WSS and to omit displaying the reliability. In the following sections, some of the constituent elements that are the same as those described in the first embodiment will be referred to by using the same reference characters, and explanations thereof will be omitted.

Figure 27:
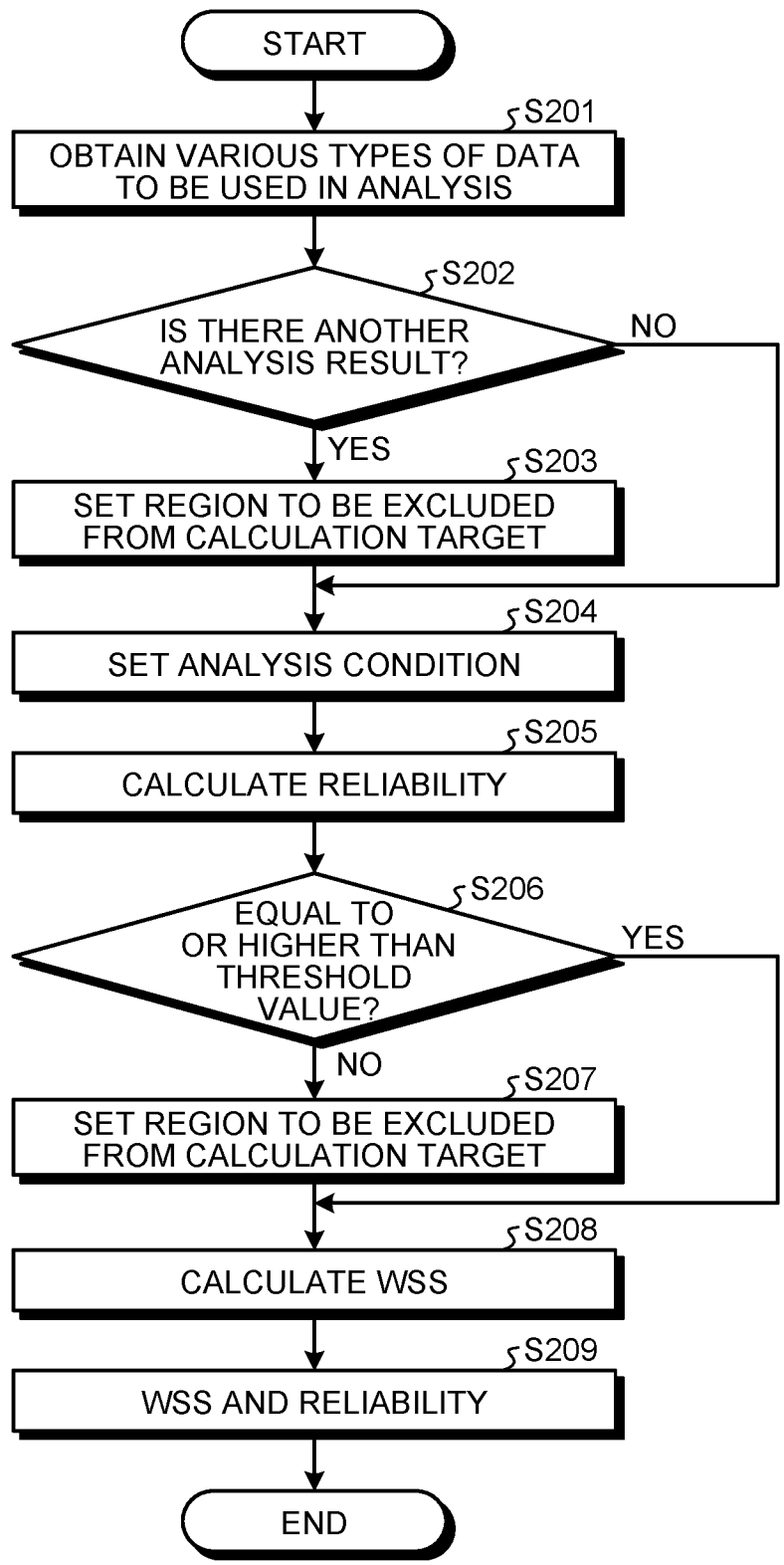
FIG. 27 is a flowchart illustrating a processing procedure of processes performed by processing functions included in the processing circuitry of a medical information processing apparatus according to a second embodiment.

An example of processes according to the second embodiment will be explained with reference to FIG. 27. FIG. 27 is a flowchart illustrating a processing procedure of the processes performed by the processing functions included in the processing circuitry 155 of the medical information processing apparatus 150 according to the second embodiment.

At first, the calculating function 155b obtains various types of data to be used in an analysis (step S201). For example, the calculating function 155b obtains a coronary artery CT image of the patient from either the X-ray CT apparatus 110 or the medical image storage apparatus 120, via the NW interface 151.

Subsequently, the calculating function 155b judges whether or not there is another analysis result (step S202). In this situation, the term "another analysis result" denotes an analysis result that is related to the patient, but is different from the WSS to be calculated at step S208 described below. For example, when an analysis was previously performed on the patient, the calculating function 155b determines that there is another analysis result (step S202: Yes). The other analysis result is saved, for example, in the medical image storage apparatus 120 or the multi-department system 130. Further, the calculating function 155b obtains the other analysis result via the NW interface 151 and sets a region to be excluded from the calculation target (step S203).

For example, WSS may be used for judging whether or not a perfusion function of a coronary artery has declined. Accordingly, there is little necessity in calculating WSS with respect to a region where it is clear that the perfusion function of the coronary artery has not declined.

Accordingly, the calculating function 155b obtains a result of a previously-performed CT perfusion process as the other analysis result, for example, and excludes a certain region where the perfusion function has not declined, from the calculation target. More specifically, the calculating function 155b obtains a distribution of blood amounts (or contrast agent amounts) supplied to the myocardia on the basis of a perfusion image and excludes the region where a threshold value is exceeded from the calculation target on the assumption that no disease is present.

Alternatively, the calculating function 155b may set a region to serve as the calculation target at step S203. For example, the calculating function 155b may set only a certain region that is likely to have a disease, as the region serving as the calculation target. In one example, the calculating function 155b obtains, as the other analysis result, a region identified as having calcification or plaque on the basis of a previously-acquired medical image, so as to set the identified region as the region serving as the calculation target. In another example, the calculating function 155b may set only a certain region that is likely to have high WSS values, as the region serving as the calculation target. In one example, the calculating function 155b obtains, as the other analysis result, a blood flowrate, a blood vessel diameter, a change amount in the blood vessel diameter, or the like. Further, the calculating function 155b sets, as the region serving as the calculation target, a region having a high blood flowrate, a region in which the blood vessel is narrower, a region having a large change in the blood vessel diameter, or the like. On the contrary, when there is no other analysis result (step S202: No), step S203 is omitted.

Subsequently, the setting function 155a sets an analysis condition (step S204). For example, the memory 152 has stored therein a plurality of settings with respect to at least one of: the calculation condition, the shape, the characteristics, and the fluid. The setting function 155a selects one of the plurality of settings stored in the memory 152 and determines the selected setting as the analysis condition.

After that, the calculating function 155b calculates a reliability of the WSS calculated under the analysis condition determined by the setting function 155a (step S205). In this situation, as long as the analysis condition has been determined, the calculating function 155b is able to calculate the reliability of the WSS to be calculated under the analysis condition, even when the WSS has not actually been calculated. There are, however, certain items that cannot be calculated until after the WSS is calculated (e.g., the reliability B6 related to the interim calculation result). The calculating function 155b may omit those items from the calculation of the WSS, as appropriate. Further, when having set the region to be excluded from the calculation target at step S203, the calculating function 155b may omit the calculation of the reliability with respect to the excluded region.

Subsequently, the calculating function 155b judges whether or not the calculated reliability exceeds a threshold value (step S206). In this situation, when the reliability is lower than the threshold value (step S206: No), the calculating function 155b sets a region to be excluded from the calculation target (step S207). In other words, even if a WSS value having a low reliability were to be calculated, the use thereof would be limited. Accordingly, the calculating function 155b excludes the region having the low reliability from the WSS calculation target. For example, the calculating function 155b calculates a reliability with respect to each of three main branches of the coronary artery and further sets only one or more blood vessels of which the reliability exceeds the threshold value as a target region for which WSS is to be calculated. When the reliability exceeds the threshold value with respect to all the blood vessels (step S206: Yes), step S207 is omitted.

After that, the calculating function 155b performs an analysis under the analysis condition determined by the setting function 155a and calculates WSS (step S208). When having set the region to be excluded from the calculation target at step S203 or step S207, the calculating function 155b may omit the calculation of the WSS with respect to the excluded region. After that, the output function 155c causes the display 154 to display the WSS and the reliability calculated (step S209).

Another example of processes according to the second embodiment will be explained with reference to FIG. 28. FIG. 28 is a flowchart illustrating another processing procedure of the processes performed by the processing functions included in the processing circuitry 155 of the medical information processing apparatus 150 according to the second embodiment.

At first, the calculating function 155b obtains various types of data to be used in an analysis (step S301). For example, the calculating function 155b obtains a coronary artery CT image of the patient from either the X-ray CT apparatus 110 or the medical image storage apparatus 120, via the NW interface 151. Subsequently, the calculating function 155b judges whether or not there is another analysis result (step S302). When there is another analysis result (step S302: Yes), the calculating function 155b sets a region to be excluded from the calculation target on the basis of the other analysis result (step S303). On the contrary, when there is no other analysis result (step S302: No), step S303 is omitted. After that, the setting function 155a sets an analysis condition (step S304). Further, the calculating function 155b calculates a reliability with respect to the WSS calculated under the analysis condition determined by the setting function 155a (step S305).

Subsequently, the setting function 155a judges whether or not the calculated reliability exceeds the threshold value (step S306). In this situation, when the reliability is lower than the threshold value (step S306: No), the setting function 155a re-sets the analysis condition (step S307). More specifically, the setting function 155a re-determines the analysis condition so that the reliability becomes higher.

For example, when the shape and the like have been obtained on the basis of a CT image, the setting function 155a is able to make the calculated reliability higher, by changing the setting to a CT image using a higher dose or to another type of medical image such as an IVUS image. In this situation, the output function 155c may propose to the user the acquisition of the CT image using the higher dose or another type of medical image or may issue a medical examination order.

In other examples, the setting function 155a is able to make the calculated reliability higher, by making the mesh finer, changing the shape of the mesh, changing the quality of the mesh from a first-order mesh to a second-order mesh, or changing the calculation model to a more complicated one. In this manner, by sequentially adjusting the settings according to the reliability, it is possible to try to shorten the calculation period, while guaranteeing a necessary level of precision.

When the analysis condition is re-set so as to make the reliability higher, the calculation amount of the analysis may increase in many situations. For example, when selecting a calculation model, the precision level of the calculation and the calculation period are usually in a trade-off relationship.

Further, from the viewpoints of imaging periods and radiation exposure amounts, acquiring a medical image from a large range imposes a large burden on the patient. For this reason, the setting function 155a may re-set the analysis condition so that the reliability becomes higher only with respect to a partial region. For example, the setting function 155a may re-set the analysis condition only with respect to a specific blood vessel or region such as a blood vessel that may exhibit a serious symptom upon the occurrence of stenosis or a region having a large number of clinical cases.

After the analysis condition has been re-set, the calculating function 155b re-calculates a reliability with respect to the WSS calculated under the re-set analysis condition. Further, when the calculated reliability exceeds the threshold value (step S306: Yes), the calculating function 155b calculates WSS under the analysis condition that was set most recently (step S308). In this situation, when having set the region to be excluded from the calculation target at step S303, the calculating function 155b may omit the calculation of WSS with respect to the excluded region. After that, the output function 155c causes the display 154 to display the WSS and the reliability calculated (step S309).

At steps S209 and S309, the output function 155c may transmit the reliability calculated by the calculating function 155b to an external device such as the medical information display apparatus 140. In that situation, the external device displays the reliability so as to be presented to the user. Further, for example, a part of the processes illustrated in FIG. 27 (e.g., step S202, step S203) may be omitted, as appropriate. Similarly, a part of the processes illustrated in FIG. 28 (e.g., step S302, step S303) may be omitted, as appropriate.

Further, at steps S209 and S309, the output function 155c may display only the WSS while omitting the display of the reliability. In the example illustrated in FIG. 27, the WSS is calculated only with respect to the region of which the reliability exceeds the threshold value, as a result of the processes at steps S206 and S207. Also, in the example illustrated in FIG. 28, the analysis condition is re-set so that the reliability exceeds the threshold value, as a result of the processes at steps S306 and S307. In other words, the reliability of the WSS calculated in the examples in FIGS. 27 and 28 is guaranteed. Accordingly, the user is able to use the WSS as reliable information, even when the reliability thereof is not displayed. In other words, the medical information processing apparatus 150 according to the second embodiment is able to make the WSS value easier to use for the user, regardless of whether the reliability is displayed or not.

In the embodiments described above, the examples are explained in which the medical information processing apparatus 150 is configured to calculate the WSS and the reliabilities; however, possible embodiments are not limited to these examples. For instance, it is possible to have a part of the calculation performed on the side of a server, by using a server-client type computer configuration. For example, it is acceptable to perform processes having a large calculation amount such as a fluid simulation for calculating the WSS on the server side and to perform the other processes on the client side.

It is possible to keep the data size of blood vessel structure information extremely small through a data compression, by setting the same value for each structure and transmitting data kept in correspondence with coordinates. For example, when there are two types of structures such as blood vessel walls and structures other than the blood vessel walls, it is possible to express the structures with binary values of 0 and 1. Similarly, when there are ten types of structures, it is possible to express the structures by using denary values of 0 to 9. In this manner, by communicating only the data that is necessary for the calculation between the server side and the client side, it is possible to decrease the transfer speed and the calculation cost on the server side. In addition, it is also acceptable to specify, on the server side, a blood vessel branch subject to the calculation on the basis of an instruction from the user, so that WSS is calculated with respect to only the specified blood vessel branch.

Further, in the embodiments described above, the WSS was explained as an index value related to the blood flow; however, other index values are similarly applicable. For example, the calculating function 155b is also capable of calculating a reliability with respect to other index values, such as FFR (Fractional Flow Reserve), IFR (Instantaneous wave-Free Ratio), blood flow, blood pressure, variation with time of these index values, combinations of these index values, combinations of an index value related to the blood flow and an index value related to geometric shape of blood vessel, combinations of an index value related to the blood flow and an functional index of target tissue which supplies blood flow, and the embodiments described above are similarly applicable to these other index values.

Further, in the embodiments described above, the medical information processing apparatus 150 is configured to calculate the index value related to the blood flow; however, another apparatus may be configured to calculate the index value related to the blood flow. For example, the output function 155c may be configured to obtain WSS calculated by the other apparatus via the NW interface 151, so as to cause the display 154 to display the obtained WSS so as to be kept in correspondence with the reliability calculated by the calculating function 155b.

Further, in the embodiments described above, the example was explained in which the setting unit, the calculating unit, and the output unit of the present disclosure are realized as the setting function, the calculating function, and the output function included in the processing circuit; however, possible embodiments are not limited to this example. For instance, instead of having the units realized as the setting function, the calculating function, and the output function described in the embodiments, it is also acceptable to realize the functions of the setting unit, the calculating unit, and the output unit of the present disclosure by using only hardware, only software, or a combination of hardware and software.

The term "processor" used in the above explanations denotes, for example, a Central Processing Unit (CPU), a Graphics Processing Unit (GPU), or a circuit such as an Application Specific Integrated Circuit (ASIC) or a programmable logic device (e.g., a Simple Programmable Logic Device [SPLD], a Complex Programmable Logic Device [CPLD], or a Field Programmable Gate Array [FPGA]). When the processor is a CPU, for example, the processor realizes the functions by reading and executing the programs saved in a storage circuit. In contrast, when the processor is an ASIC, for example, instead of having the programs saved in the storage circuit, the functions are directly incorporated in the circuit of the processor as a logic circuit. Further, the processors according to the embodiments do not each necessarily have to be structured as a single circuit. It is also acceptable to structure a single processor by combining together a plurality of independent circuits, so as to realize the functions thereof. Furthermore, it is also acceptable to integrate two or more of the constituent elements illustrated in any of the drawings into a single processor so as to realize the functions thereof.

Further, although FIG. 1 illustrates the example in which the single memory (the memory 152) stores therein the programs corresponding to the processing functions of the processing circuitry 155, possible embodiments are not limited to this example. For instance, it is also acceptable to provide a plurality of memories 152 in a distributed manner, so that the processing circuitry 155 is configured to read a corresponding program from each of the individual memories 152. Further, instead of having the programs saved in the one or more memories 152, it is also acceptable to directly incorporate the programs into the circuit of a processor. In that situation, the processor realizes the functions by reading and executing the programs incorporated in the circuit thereof.

For example, the programs executed by the one or more processors may be provided as being incorporated in advance in a Read-Only Memory (ROM), a storage circuit, or the like. Alternatively, the programs may be provided as being recorded on a non-transitory computer-readable storage medium such as a Compact Disk Read-Only Memory (CD-ROM), a flexible disk (FD), a Compact Disk Recordable (CD-R), a Digital Versatile Disk (DVD), or the like, in a file that is in an installable format or in an executable format for these devices. Further, the programs may be stored in a computer connected to a network such as the Internet so as to be provided or distributed as being downloaded via the network. For example, the programs are structured by using modules including the processing functions described above. In the actual hardware, as a result of a CPU reading and executing the programs from a storage medium such as a ROM, the modules are loaded into a main memory device, so as to be generated in the main memory device.

The constituent elements of the apparatuses and the devices according to the embodiments described above are based on functional concepts. Thus, it is not necessary to physically configure the constituent elements as indicated in the drawings. In other words, specific modes of distribution and integration of the apparatuses and the devices are not limited to those illustrated in the drawings. It is acceptable to functionally or physically distribute or integrate all or a part of the apparatuses and the devices in any arbitrary units, depending on various loads and the status of use. Furthermore, all or an arbitrary part of the processing functions performed by the apparatuses and the devices may be realized by a CPU and a program analyzed and executed by the CPU or may be realized as hardware using wired logic.

With regard to the processes explained in the embodiments and the modification examples described above, it is acceptable to manually perform all or a part of the processes described as being performed automatically. Conversely, by using a publicly-known method, it is also acceptable to automatically perform all or a part of the processes described as being performed manually. Further, unless noted otherwise, it is acceptable to arbitrarily modify any of the processing procedures, the controlling procedures, specific names, and various information including various types of data and parameters that are presented in the above text and the drawings.

According to at least one aspect of the embodiments described above, it is possible to make the index value related to the blood flow easier to use.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

In relation to the embodiments described above, the following notes are disclosed as certain aspects and selective characteristics of the present disclosure.

Note 1

A medical information processing apparatus comprising:
a memory configured to store therein a plurality of settings about at least one of a calculation condition, a shape, a characteristic, and a fluid; and
processing circuitry configured to select at least one of the plurality of settings, to determine the selected setting as an analysis condition, and to calculate a reliability with respect to an index value that is related to a blood flow and is calculated under the analysis condition.

Note 2

The processing circuitry may calculate the index value under the analysis condition.

Note 3

The processing circuitry may output the reliability.

Note 4

The processing circuitry may cause the reliability to be displayed so as to be kept in correspondence with the index value.

Note 5

The processing circuitry may calculate the index value with respect to a target region set on a basis of the reliability.

Note 6

The processing circuitry may determine a target region on a basis of an analysis result different from the index value, and
the processing circuitry may calculate the index value with respect to the target region.

Note 7

The processing circuitry may re-determine the analysis condition on a basis of the reliability, and
the processing circuitry may calculate the index value under the re-determined analysis condition.

Note 8

The processing circuitry may re-determine the analysis condition so that the reliability becomes higher.

Note 9

On a basis of the analysis condition, the processing circuitry may calculate at least one selected from among: a first reliability related to the calculation condition; a second reliability related to the shape; a third reliability related to the characteristic; and a fourth reliability related to the fluid, and
the processing circuitry may calculate the reliability with respect to the index value, on a basis of at least one of the first, the second, the third, and the fourth reliabilities.

Note 10

The processing circuitry may calculate the first reliability on a basis of at least one of: a reliability related to a size of a mesh; a reliability related to a shape of a mesh; a reliability related to quality of a mesh; a reliability related to temporal resolution; and a reliability related to a calculation model.

Note 11

The processing circuitry may detect a region in which a turbulent flow is likely to occur on a basis of one or both of a shape of a blood vessel and fluid information of blood, and
on a basis of a result of the detection, the processing circuitry may calculate at least one of: the reliability related to the size of the mesh; the reliability related to the shape of the mesh; and the reliability related to the quality of the mesh.

Note 12

The processing circuitry may detect a region having a large movement on a basis of medical images in a time series, and
on a basis of a result of the detection, the processing may circuitry calculate at least one of: the reliability related to the size of the mesh; the reliability related to the shape of the mesh; and the reliability related to the quality of the mesh.

Note 13

The processing circuitry may calculate the reliability related to the calculation model on a basis of a type of a boundary condition.

Note 14

The type of the boundary condition may include a condition of a type that is obtained by further performing calculation on a basis of information obtained from an image of an examined subject.

Note 15

The processing circuitry may calculate the second reliability on a basis of at least one of: a reliability related to a type of an image; a reliability related to an image taking condition; a reliability related to a type of a blood vessel; a reliability related to a shape of a blood vessel; a reliability related to an intravascular structure; a reliability related to an artifact; a reliability related to an interim calculation result; a reliability related to a shape obtaining method; a reliability related to a phase; and a reliability related to magnitude of a movement.

Note 16

The processing circuitry may detect a position and a type of the intravascular structure, and
in accordance with the type of the intravascular structure, the processing circuitry may calculate the reliability related to the intravascular structure with respect to each position.

Note 17

The processing circuitry may detect one or both of a type of the artifact and an amount of the artifact, and
the processing circuitry may calculate the reliability related to the artifact on a basis of a result of the detection.

Note 18

The processing circuitry may calculate the third reliability on a basis of at least one of: a reliability related to a type of

43 an image; a reliability related to an image taking condition; a reliability related to a type of a blood vessel; and a reliability related to a phase.

Note 19

The processing circuitry may calculate the fourth reliability on a basis of at least one of: a reliability related to a type of an image; a reliability related to an image taking condition; a reliability related to a type of a blood vessel; and a reliability related to a phase.

Note 20

The memory may further store therein patient information, and
the processing circuitry may calculate the reliability based on the analysis condition and the patient information.

Note 21

A medical information processing system comprising:
a memory configured to store therein a plurality of settings about at least one of a calculation condition, a shape, a characteristic, and a fluid; and
processing circuitry configured to select at least one of the plurality of settings, to determine the selected setting as an analysis condition, and to calculate a reliability with respect to an index value that is related to a blood flow and is calculated under the analysis condition.

Note 22

A medical information processing method comprising:
selecting at least one of a plurality of settings about at least one of a calculation condition, a shape, a characteristic, and a fluid and determining the selected setting as an analysis condition; and
calculating a reliability with respect to an index value that is related to a blood flow and is calculated under the analysis condition.

What is claimed is:

1. A medical information processing apparatus, comprising:
a memory configured to store therein a plurality of settings about at least one of a calculation condition, a shape, a characteristic, or a fluid; and
processing circuitry configured to acquire image data acquired from a scan of a blood vessel of a patient, select at least one of the plurality of settings, determine the selected setting as an analysis condition, calculate a reliability with respect to an index value that is related to a blood flow, and cause the calculated reliability to be displayed so as to be kept in correspondence with the index value,
wherein the processing circuitry is further configured to calculate, under the analysis condition and based on the acquired image data, the index value with respect to a target region, the target region being set based on the calculated reliability.

2. The medical information processing apparatus according to claim 1, wherein the processing circuitry is further configured to:
determine a first target region based on an analysis result different from the index value,
set a second target region included in the first target region, as the target region, and

44 calculate the index value with respect to the second target region.

3. The medical information processing apparatus according to claim 1, wherein the processing circuitry is further configured to:
re-determine the analysis condition based on the calculated reliability, and
calculate the index value under the re-determined analysis condition.

4. The medical information processing apparatus according to claim 3, wherein the processing circuitry is further configured to re-determine the analysis condition so that the reliability becomes higher.

5. The medical information processing apparatus according to claim 1, wherein
based on the analysis condition, the processing circuitry is further configured to calculate at least one selected from among: a first reliability related to the calculation condition; a second reliability related to the shape; a third reliability related to the characteristic; or a fourth reliability related to the fluid, and
the processing circuitry is further configured to calculate the reliability with respect to the index value, based on at least one of the first, the second, the third, or the fourth reliabilities.

6. The medical information processing apparatus according to claim 5, wherein the processing circuitry is further configured to calculate the first reliability based on at least one of: a reliability related to a size of a mesh; a reliability related to a shape of a mesh; a reliability related to quality of a mesh; a reliability related to temporal resolution; or a reliability related to a calculation model.

7. The medical information processing apparatus according to claim 6, wherein the processing circuitry is further configured to detect a region in which a turbulent flow is likely to occur based on one or both of a shape of a blood vessel and fluid information of blood, and
based on a result of the detection, the processing circuitry is further configured to calculate at least one of the reliability related to the size of the mesh; the reliability related to the shape of the mesh; or the reliability related to the quality of the mesh.

8. The medical information processing apparatus according to claim 6, wherein the processing circuitry is further configured to detect a region having a large movement based on medical images in a time series, and
based on a result of the detection, the processing circuitry is further configured to calculate at least one of: the reliability related to the size of the mesh; the reliability related to the shape of the mesh; or the reliability related to the quality of the mesh.

9. The medical information processing apparatus according to claim 6, wherein the processing circuitry is further configured to calculate the reliability related to the calculation model based on a type of a boundary condition.

10. The medical information processing apparatus according to claim 9, wherein the type of the boundary condition includes a condition of a type that is obtained by the processing circuitry further performing calculation based on information obtained from an image of an examined subject.

11. The medical information processing apparatus according to claim 5, wherein the processing circuitry is further configured to calculate the second reliability based on at least one of: a reliability related to a type of an image; a reliability related to an image taking condition; a reliability related to a type of a blood vessel; a reliability related to a shape of a blood vessel; a reliability related to an intravascular structure; a reliability related to an artifact; a reliability related to an interim calculation result; a reliability related to a shape obtaining method; a reliability related to a phase; or a reliability related to magnitude of a movement.

12. The medical information processing apparatus according to claim 11, wherein the processing circuitry is further configured to detect a position and a type of the intravascular structure, and in accordance with the type of the intravascular structure, the processing circuitry is further configured to calculate the reliability related to the intravascular structure with respect to each position.

13. The medical information processing apparatus according to claim 11, wherein the processing circuitry is further configured to:

detect one or both of a type of the artifact and an amount of the artifact, and calculate the reliability related to the artifact based on a result of the detection.

14. The medical information processing apparatus according to claim 5, wherein the processing circuitry is further configured to calculate the third reliability based on at least one of: a reliability related to a type of an image; a reliability related to an image taking condition; a reliability related to a type of a blood vessel; or a reliability related to a phase.

15. The medical information processing apparatus according to claim 5, wherein the processing circuitry is further configured to calculate the fourth reliability based on at least one of: a reliability related to a type of an image; a reliability related to an image taking condition; a reliability related to a type of a blood vessel; or a reliability related to a phase.

16. The medical information processing apparatus according to claim 1, wherein the memory further stores therein patient information, and the processing circuitry is further configured to calculate the reliability based on the analysis condition and the patient information.

17. A medical information processing system, comprising:

a memory configured to store therein a plurality of settings about at least one of a calculation condition, a shape, a characteristic, or a fluid; and processing circuitry configured to acquire image data acquired from a scan of a blood vessel of a patient, select at least one of the plurality of settings, determine the selected setting as an analysis condition, calculate a reliability with respect to an index value that is related to a blood flow, and cause the calculated reliability to be displayed so as to be kept in correspondence with the index value, wherein the processing circuitry is further configured to calculate, under the analysis condition and based on the image data, the index value with respect to a target region, the target region being set based on the calculated reliability.

18. The medical information processing system of claim 17, further comprising a medical scanning apparatus configured to perform the scan of the patient, the medical scanning apparatus including one of an X-ray Computed-Tomography (CT) scanner, a Position Emission Tomography (PET) scanner, a Magnetic Resonance Imaging (MRI) scanner, and a Single Photon Emission Computed Tomography (SPECT) scanner.

19. A medical information processing method, comprising:

acquiring image data acquired from a scan of a blood vessel of a patient;

selecting at least one of a plurality of settings about at least one of a calculation condition, a shape, a characteristic, or a fluid, and determining the selected setting as an analysis condition;

calculating a reliability with respect to an index value that is related to a blood flow; and causing the calculated reliability to be displayed so as to be kept in correspondence with the index value, wherein the method further comprises, calculating, under the analysis condition and based on the image data, the index value with respect to a target region, the target region being set based on the calculated reliability.

* * * * *